(12) United States Patent
Wheelwright et al.

(10) Patent No.: US 10,955,675 B1
(45) Date of Patent: *Mar. 23, 2021

(54) VARIABLE RESOLUTION DISPLAY DEVICE WITH SWITCHABLE WINDOW AND SEE-THROUGH PANCAKE LENS ASSEMBLY

(71) Applicant: FACEBOOK TECHNOLOGIES, LLC, Menlo Park, CA (US)

(72) Inventors: Brian Wheelwright, Sammamish, WA (US); Jacques Gollier, Sammamish, WA (US); Ying Geng, Bellevue, WA (US); Yusufu Njoni Bamaxam Sulai, Snohomish, WA (US); Fenglin Peng, Redmond, WA (US); Babak Amirsolaimani, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,820

(22) Filed: Apr. 30, 2019

(51) Int. Cl.
| | |
|---|---|
| *G02B 27/01* | (2006.01) |
| *G06F 1/3234* | (2019.01) |
| *H04W 52/02* | (2009.01) |
| *H04L 12/58* | (2006.01) |
| *G02B 27/00* | (2006.01) |

(52) U.S. Cl.
CPC ..... *G02B 27/0172* (2013.01); *G02B 27/0093* (2013.01); *G06F 1/3256* (2013.01); *H04L 51/38* (2013.01); *H04W 52/0251* (2013.01); *G02B 2027/0178* (2013.01)

(58) Field of Classification Search
CPC ............ G02B 27/0172; G02B 27/0093; G06F 1/3256; H04L 51/38; H04W 52/0251

USPC .................. 345/8, 690; 359/630; 348/330.06
See application file for complete search history.

(56) References Cited

U.S. PATENT DOCUMENTS

| | | | |
|---|---|---|---|
| 5,629,806 A * | 5/1997 | Fergason ............. | G02B 27/026 359/630 |
| 5,912,650 A * | 6/1999 | Carollo .............. | G02B 27/0172 345/7 |
| 9,223,152 B1 | 12/2015 | Kress et al. | |
| 9,576,398 B1 * | 2/2017 | Zehner .................. | G06T 19/006 |

(Continued)

OTHER PUBLICATIONS

Wheelwright, Notice of Allowance, U.S. Appl. No. 16/209,909, dated Dec. 19, 2019, 14 pgs.

*Primary Examiner* — Prabodh M Dharia
(74) *Attorney, Agent, or Firm* — Morgan, Lewis & Bockius LLP

(57) ABSTRACT

A display device is configurable to be operable in a first mode and a second mode. The display device includes an emission surface configured to output image light, a first optical assembly, and a second optical assembly. The first optical assembly is configured to receive image light from the emission surface and to direct the image light toward the eyes of a user at a first optical power. The second optical assembly includes a first region configured to receive image light from the emission surface and to direct the image light toward the eyes of a user at a second optical power. The second optical assembly also includes a second region configured to receive ambient light and to transmit at least a portion of the received ambient light at a third optical power distinct from and less than the first optical power and the second optical power.

19 Claims, 20 Drawing Sheets

(56) References Cited

U.S. PATENT DOCUMENTS

| | | | |
|---|---|---|---|
| 10,181,200 B1* | 1/2019 | Chao | H04N 5/2226 |
| 10,310,057 B2* | 6/2019 | Gan | G01S 7/4811 |
| 10,534,173 B2* | 1/2020 | Jepsen | G02B 3/0056 |
| 10,579,111 B1* | 3/2020 | Jenkins | G02B 27/0176 |
| 10,600,352 B1* | 3/2020 | Wheelwright | G02B 27/0172 |
| 10,634,907 B1* | 4/2020 | Geng | G02B 27/283 |
| 10,712,569 B2* | 7/2020 | Jiang | G02B 5/0231 |
| 10,747,309 B2* | 8/2020 | Akkaya | G02B 27/0172 |
| 2002/0080255 A1* | 6/2002 | Lichtfuss | H04N 1/00551 |
| | | | 348/333.06 |
| 2007/0070504 A1* | 3/2007 | Akutsu | G02B 27/4272 |
| | | | 359/573 |
| 2010/0290125 A1* | 11/2010 | Tohara | G02B 27/0172 |
| | | | 359/630 |
| 2012/0062784 A1* | 3/2012 | Van Heugten | H04N 5/2254 |
| | | | 348/340 |
| 2013/0113973 A1 | 5/2013 | Miao | |
| 2013/0278631 A1* | 10/2013 | Border | G06F 3/04842 |
| | | | 345/633 |
| 2013/0286053 A1* | 10/2013 | Fleck | G09G 5/10 |
| | | | 345/690 |
| 2014/0049738 A1* | 2/2014 | Hirai | H04N 13/337 |
| | | | 349/123 |
| 2014/0168034 A1* | 6/2014 | Luebke | H04N 13/339 |
| | | | 345/8 |
| 2014/0247500 A1 | 9/2014 | Takeda et al. | |
| 2015/0205132 A1* | 7/2015 | Osterhout | G02B 27/0093 |
| | | | 345/633 |
| 2015/0234477 A1 | 8/2015 | Abovitz et al. | |
| 2017/0168295 A1* | 6/2017 | Iwami | G06T 5/009 |
| 2017/0219827 A1* | 8/2017 | Pan | G02F 1/133528 |
| 2017/0293143 A1* | 10/2017 | Martinez | G02B 27/01 |
| 2017/0307890 A1 | 10/2017 | Wang et al. | |
| 2018/0017791 A1 | 1/2018 | Beckman | |
| 2018/0226014 A1* | 8/2018 | Komanduri | G02B 6/0051 |
| 2019/0049733 A1* | 2/2019 | Jiang | G02B 27/106 |
| 2019/0064526 A1 | 2/2019 | Connor | |
| 2019/0187474 A1 | 6/2019 | Bhargava et al. | |
| 2019/0271844 A1 | 9/2019 | Kress et al. | |

* cited by examiner

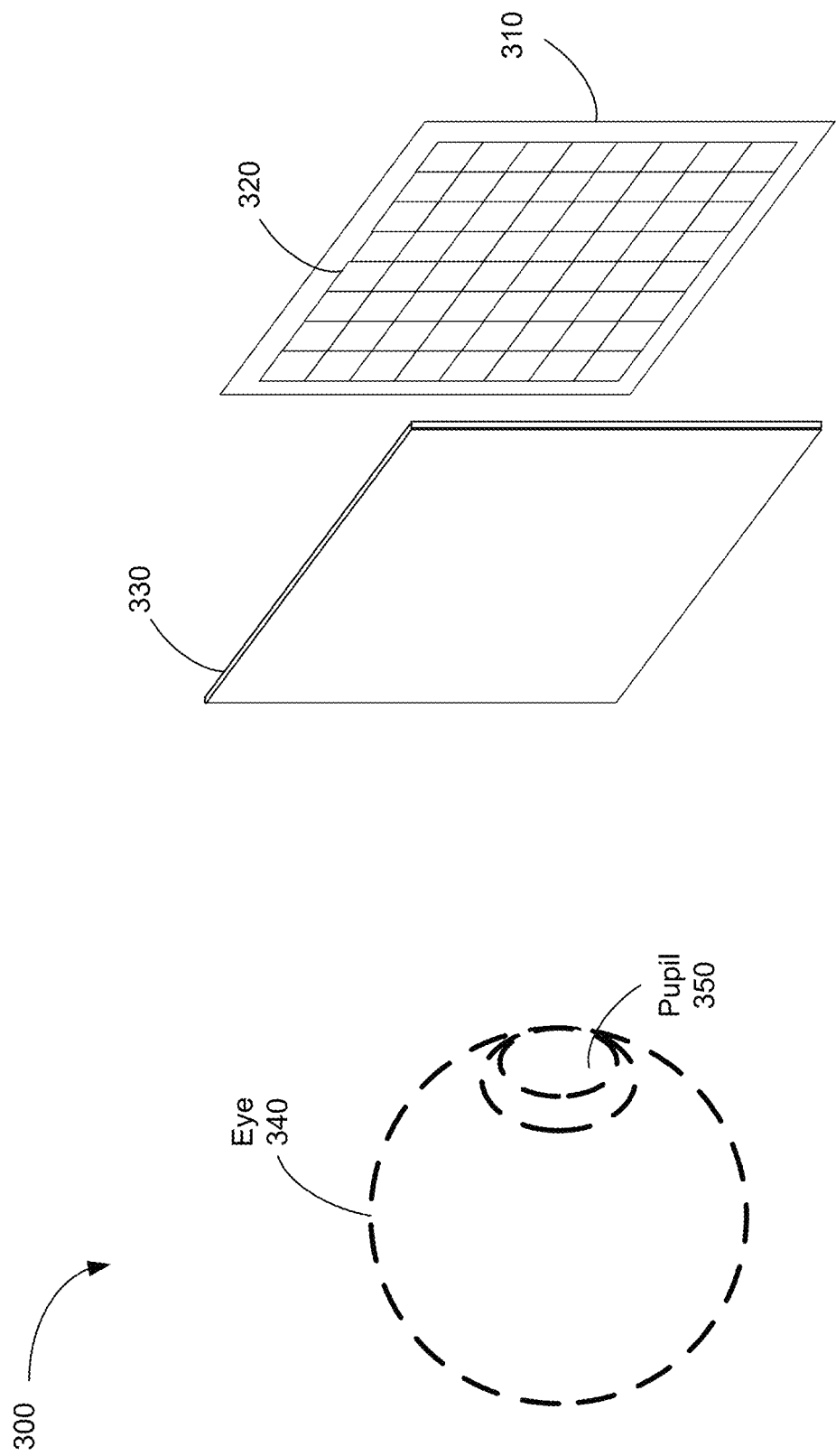

VARIABLE RESOLUTION DISPLAY DEVICE WITH SWITCHABLE WINDOW AND SEE-THROUGH PANCAKE LENS ASSEMBLY

RELATED APPLICATIONS

This application is related to U.S. patent application Ser. No. 16/209,909, filed on Dec. 4, 2018, entitled "Display Device with a Switchable Window and See-Through Pancake Lens Assembly," which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, head-mounted display devices are used for virtual reality and augmented reality operations.

SUMMARY

When using head-mounted display devices, it can be desirable for a user to selectively operate the display device in a variety of modes to suit the user's current needs. For example, it may be desirable to select a wide field-of-view mode for operations such as playing video games. In contrast, when using the display device for an application that includes detailed work (such as photo-editing), it may be desirable to operate the display device in a high resolution mode. Additionally, it may be desirable for a user to be able to switch between a fully immersive mode that prevents external or ambient light from entering a user's eyes and a see-through or partially see-through mode that allows a user to observe the outside environment while using the head-mounted display device.

Accordingly, there is a need for a head-mounted display device that allows switching (either manually or automatically) between a first mode in which a user can view displayed images with a wide field-of-view and a second mode in which a user can view displayed images with a high resolution. Additionally, there is a need for the display device to be switchable between an opaque mode that allows the user to operate the display device without interference from external or ambient light, and a see-through mode that allows the user to view the outside environment without taking off or turning off the head-mounted display.

In accordance with some embodiments, a display device is configurable to operate in either one of a first mode or a second mode. The display device includes an emission surface configured to output image light, a first optical assembly, and a second optical assembly. When the display device is operating in the first mode, the first optical assembly is configured to receive image light from the emission surface and to direct the image light at a first optical power. When the display device is operating in the second mode, the second optical assembly is configured to receive image light from the emission surface and to direct the image light at a second optical power distinct from the first optical power.

In accordance with some embodiments, a method of operating a display device, mounted near an eye of a user, includes operating the display device in one of a first mode or a second mode. The method includes generating image light, and directing the image light toward the eyes of a user at a first optical power in the first mode. The method further includes directing the image light toward the eyes of the user at a second optical power that is greater than the first optical power in the second mode.

In some embodiments, the display device further includes a window that is switchable between an opaque mode and a see-through mode. In the see-through mode, the second optical assembly is also configured to receive ambient light and to transmit at least a portion of the received ambient light at a third optical power distinct from and less than the first optical power and the second optical power.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

Figure 1:
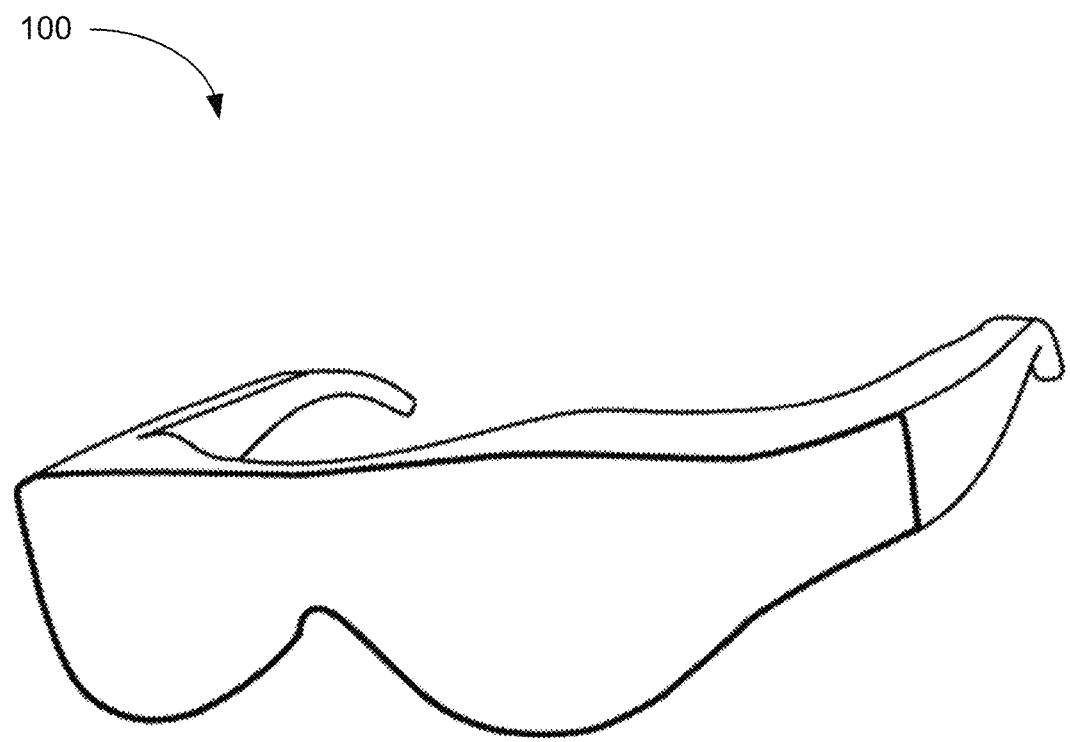
FIG. 1 is a perspective view of a display device in accordance with some embodiments.

These figures are not drawn to scale unless indicated otherwise.

DETAILED DESCRIPTION

The present disclosure provides a head-mounted display device (or display device) that can operate in either a wide field-of-view mode or a high-resolution mode. The head-mounted display device includes an emission surface configured to output image light, and one or more optical assemblies to direct the image light toward an eye of a user. When the display device is operating in the high-resolution mode, the one or more optical assemblies direct the image light at a first optical power. When the display device is operating in the wide field-of-view mode, the one or more optical assemblies direct the image light at a second optical power higher than the first optical power. The display device further includes a switchable window configurable to be in an opaque mode or see-through mode. When the switchable window is in the opaque mode, external or ambient light is blocked from entering the head-mounted display, and when the switchable window is in the see-through mode, the head-mounted display is configured to allow external or ambient light to reach the eyes of a viewer. In some embodiments, the external or ambient light is transmitted to the viewer without significant optical aberrations from the optical components of the display device, in order to allow the user of the display device to accurately perceive and interact with objects in the outside environment.

In some embodiments, the switchable window is set in the see-through mode or opaque mode based on a gaze direction of the user's eyes (e.g., when an eye-tracking module determines that the user's eyes are gazing towards a particular part or any part of a periphery of the user's field or view or a periphery of the display device, the display device is set in see-through mode). A method of operating the display device is also described herein.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a perspective view of display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user.

Figure 2:
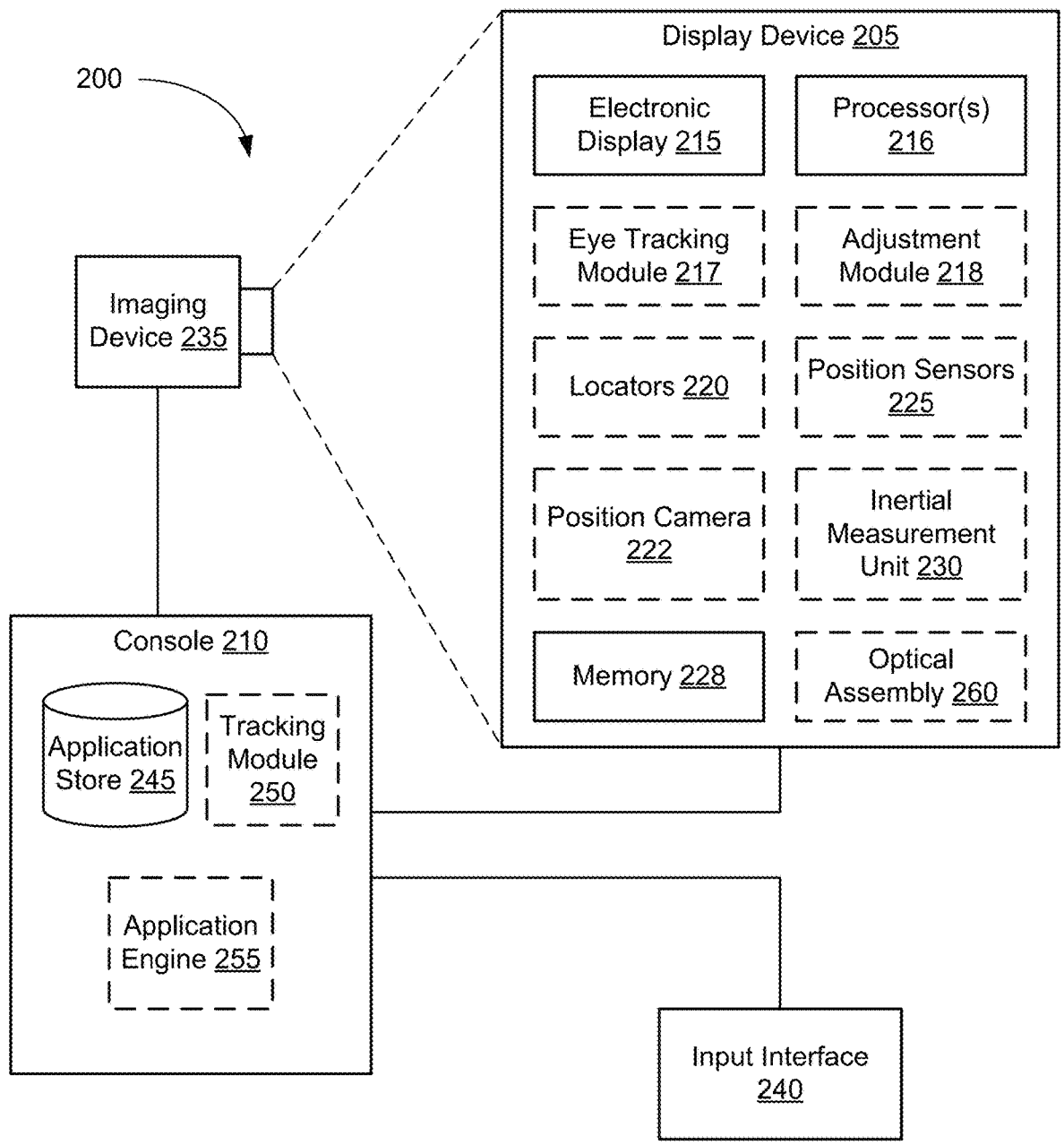
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field-of-view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of a display device 300, which corresponds to part of or all of display device 100 (see FIG. 1) in accordance with some embodiments. In some embodiments, display device 300 includes an emission surface 310 (e.g., a light emission device array or reflective element), and an optical assembly (e.g., optical assembly 260) having one or more optical components 330 (e.g., lenses). In some embodiments, display device 300 also includes an IR detector array.

In some embodiments, light emission device array 310 emits image light and optional IR light toward the optical components 330. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user, and minimize the amount of image light provided to other areas in the eyebox.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, light emission device array 310.

One or more optical components 330 receive the image light (or modified image light, e.g., attenuated light) from emission surface 310, and direct the image light to a detected or presumed location of the pupil 350 of an eye 340 of a user. In some embodiments, the one or more optical components include one or more optical assemblies 260.

FIGS. 4A-4E illustrate display device 400 in accordance with some embodiments. Display device 400 includes optical assemblies 412 and 414 and is configurable to operate in either a wide field-of-view mode or a high resolution mode. Display device 400 also includes switchable window 416 configurable to be in an opaque mode or a see-through-mode.

Figure 4A:
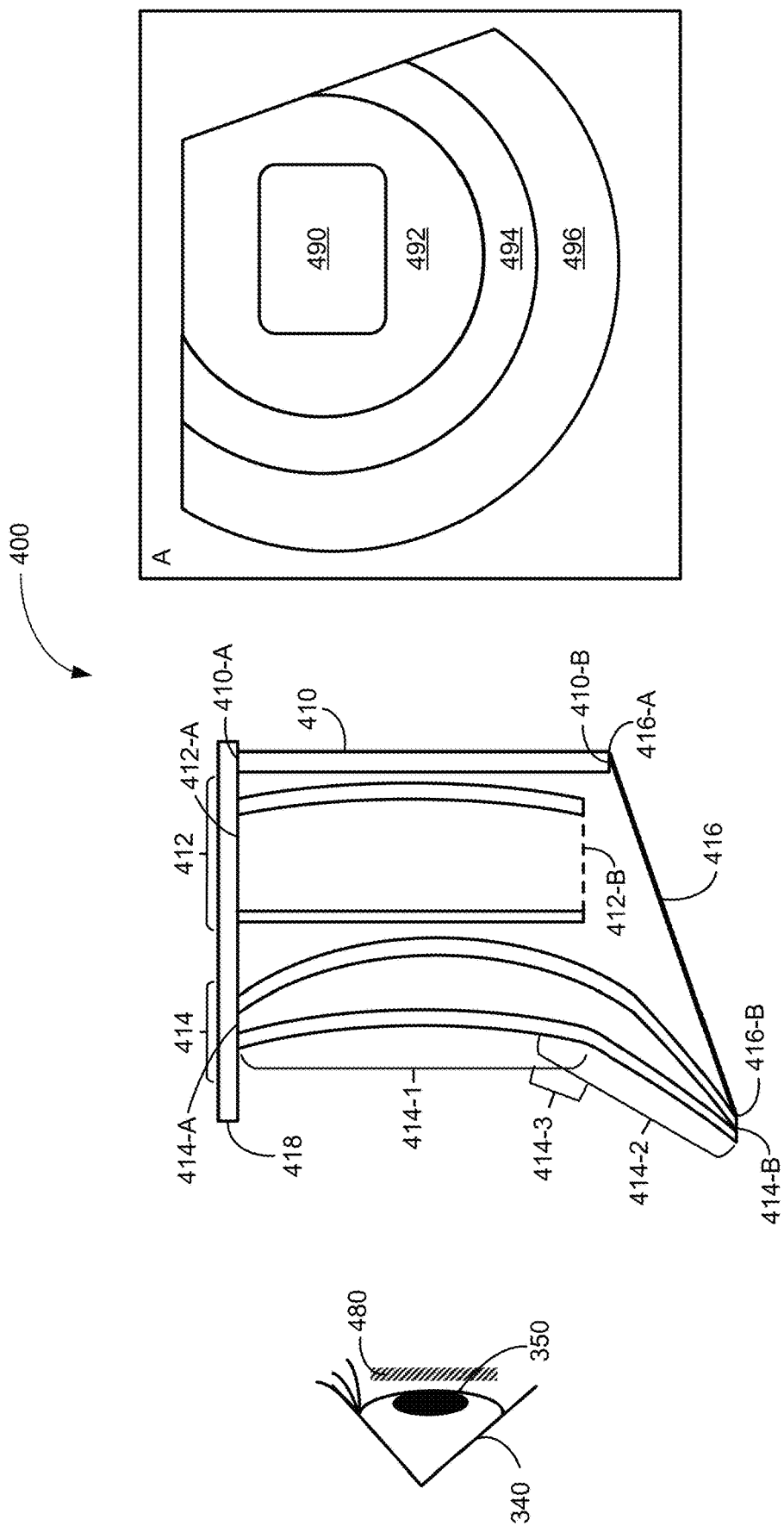
FIGS. 4A-4E are schematic diagrams illustrating a display device and its various operation modes in accordance with some embodiments.

Referring to FIG. 4A, display device 400 further includes an emission surface 410. In some embodiments, display device 400 may include switchable window 416 and frame 418. In some embodiments, frame 418, emission surface 410, and switchable window 416 form a housing and define an interior space or housing for display device 400. First optical assembly 412 and second optical assembly 414 are disposed inside the housing (e.g., in the interior space). In some embodiments, as shown, first optical assembly 412 is disposed (e.g., located) between emission surface 410 and second optical assembly 414. In some embodiments, the shape and dimensions of frame 418, first optical assembly 412, and second optical assembly 414 are determined in order to avoid interference with a user's brow bone. When display device 400 is a head-mounted display device, display device 400 corresponds to display device 100 shown in FIG. 1.

Figure 4B:
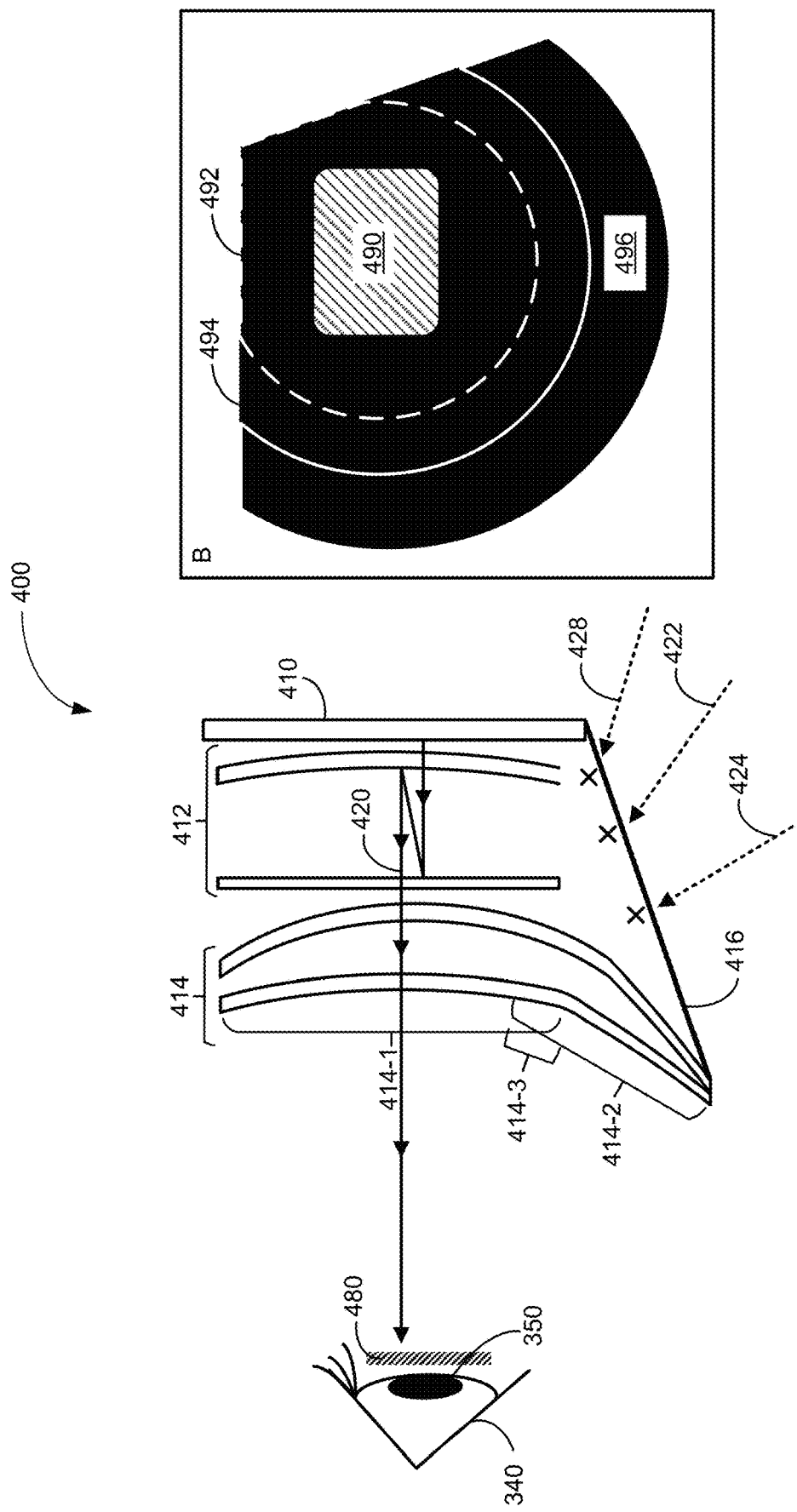
Figure 4C:
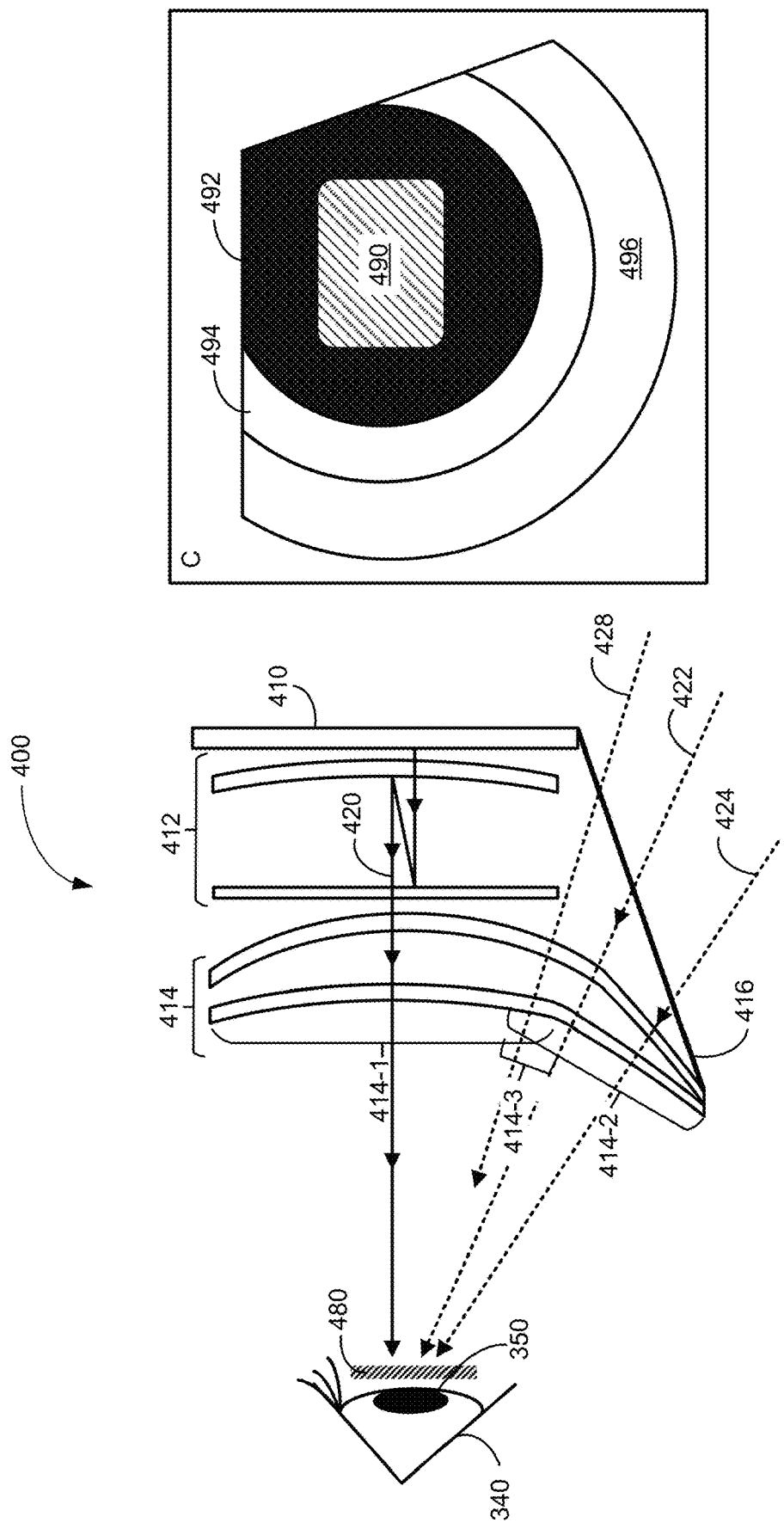
Figure 4D:
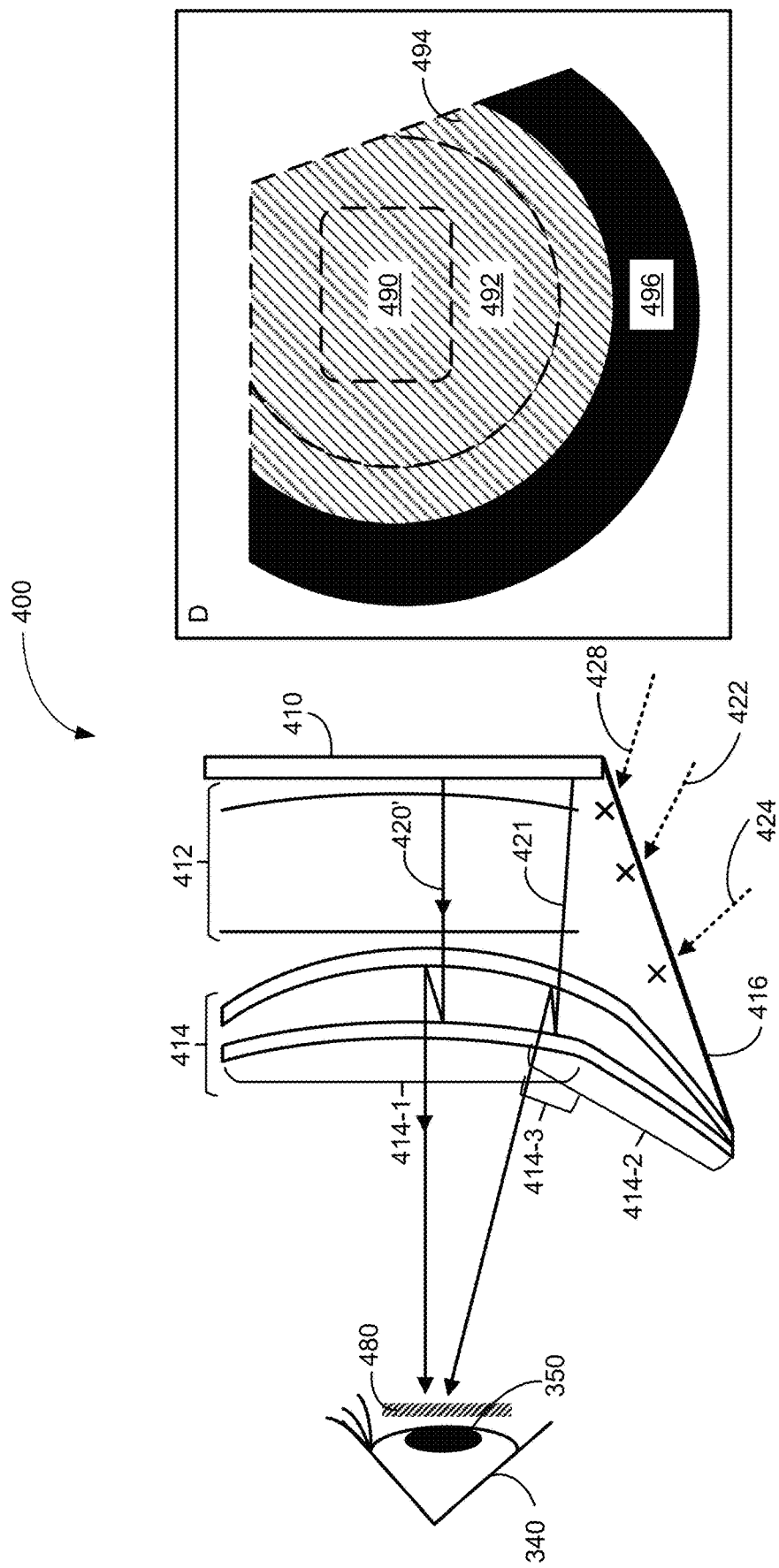

Emission surface 410 (e.g., a display surface or display element) is configured to output image light (e.g., rays 420, 420', and 421, shown in FIGS. 4B-4D). In some embodiments, emission surface 410 includes a circular polarizer (not shown, e.g., a linear polarizer and/or an optical retarder, such as a quarter wave plate) that is configured to convert unpolarized light or linear light into light having a circular polarization.

First optical assembly 412 includes one or more optical components (such as an optical retarder, a beam splitter, and/or a polarizing reflector) and is configured to direct image light (e.g., ray 420) via a folded optical path to an eyebox 480, representing position and size of a pupil 350 of a user's eyes 340, with a first optical power. FIGS. 4B and 4C shows an optical path of image light (e.g., ray 420) that is emitted from emission surface 410 and directed toward eyebox 480 by first optical assembly 412. In some embodiments, first optical assembly 412 has surfaces that are curved (e.g., spherical or aspherical). The folded optical path is provided to increase field-of-view without increasing the physical distance between the display and the eye of the user or compromising image quality.

Second optical assembly 414 has a first region 414-1 and a second region 414-2. The first region 414-1 of the second optical assembly 414 is configured to direct image light (e.g., rays 420 and 421) via a folded optical path to eyebox 480 with a second optical power. In some embodiments, the second optical power is distinct from and greater than the first optical power. In some embodiments, the first region 412-1 of the optical assembly 412 has surfaces that are curved (e.g., spherical or aspherical). The folded optical path is provided to increase field-of-view without increasing the physical distance between the display and the eye of the user or compromising image quality.

The second region 414-2 of the second optical assembly is configured to transmit external or ambient light (e.g., rays 422, 424, 428 shown in FIGS. 4B-4E) toward eyebox 480 at a third optical power when switchable window 416 is in the see-through mode. In some embodiments, the third optical power is different from and less than the first optical power and the second optical power. In some embodiments, the third optical power is zero. In some embodiments, the second region 414-2 of second optical assembly 414 is configured to reduce, minimize, or eliminate optical aberrations (e.g., optical power, focus, astigmatism, and/or distortion) in the ambient light as it is transmitted through the second region 414-2 of second optical assembly 414 so that the user may have a proper view (e.g., undistorted, with minimal optical distortions and/or aberrations) of the outside environment. In some embodiments, second region 414-2 of second optical assembly 414 is configured to transmit ambient light without adding significant optical aberrations to the ambient light (including on-axis and off-axis ambient light). In some embodiments, second region 414-2 of second optical assembly 414 is also configured to transmit external or ambient light with substantially zero (e.g., zero, negligible, or insignificant) optical power (e.g., without adding optical power, or without any magnification).

In some embodiments, the first region 414-1 of second optical assembly 414 and the second region 414-2 of second optical assembly 414 may overlap with each other by a transition region 414-3, through which the user can receive either or both the image light and the ambient light. Thus, in some embodiments, the first region 414-1 of second optical assembly 414 and the second region 414-2 of second optical assembly 414 are not mutually exclusive to one another. In some embodiments, the transition region 414-3 is between the first region 414-1 of second optical assembly 414 and the second region 414-2 of second optical assembly 414. In some embodiments, at least a portion of the user's field-of-view is capable of augmented reality (e.g., AR) applications, as described below in more detail with respect to FIG. 4E.

Switchable window 416 is configurable to either block or allow transmission of ambient light (e.g., rays 422, 424, 428; light originating from outside the housing such as light from the environment outside the display device including off axis light). When switchable window 416 is in opaque mode, shown in FIGS. 4B and 4D, switchable window 416 blocks ambient light from entering the interior space of display device 400. When switchable window 416 is in a see-through mode, ambient light is transmitted through switchable window 416 into the interior space of the display device 400 shown in FIGS. 4C and 4E. Further details regarding switchable window 416 can be found in U.S. patent application Ser. No. 16/209,909, filed on Dec. 4, 2018, entitled "Display Device with a Switchable Window and See-Through Pancake Lens Assembly," which is incorporated by herein in its entirety.

In some embodiments, switchable window 416 can be set to operate in see-through mode based on a gaze direction of the user's eyes. For example, when eye-tracking module 217 determines that the user's eyes are gazing towards the second region 414-2 of second optical assembly 414 or towards a periphery of the user's field-of-view, switchable window 416 switches into or remains in see-through mode. In some embodiments, when switchable window 416 is set to operate in see-through mode, outside observers can see the user's face and/or eyes through the sides of display device 400. In such cases, display device 400 has the capability to provide an external cue (e.g., allowing external observers to see the user's face and/or eyes) as to whether the user is in a mixed-reality environment (e.g., augmented reality or when the device is in see-through mode) or is immersed in a virtual reality environment. When eye-tracking module 217 determines that the user's eyes are gazing towards the first region 414-1 of second optical assembly 414 or towards emission surface 410, switchable window 416 switches into or remains in opaque mode. In some embodiments, when switchable window 416 is set to operate in opaque mode, outside observers will see a black or reflective shield around the edges of display device 400.

Inset A in FIG. 4A shows a field of view for a user's left eye when the user is using display device 400. The user's field of view has four areas, first area 490, second area 492 surrounding first area 490, third area 494 that at least partially surrounds second area 492, and fourth area 496 that at least partially surrounds third area 494, described in detail below.

Optical assemblies 412 and 414 provide different field of views and different resolutions of an image displayed on the emission surface 410. In some embodiments, first optical assembly 412 is used to project an image displayed on the emission surface such that the image has a higher resolution while occupying a smaller area in a user's field of view than second optical assembly 414, as discussed further below.

When display device 400 is in the high resolution mode, virtual images formed by display device 400 with the image light from emission surface 410 occupy first area 490 of the user's field-of-view. When display device 400 is in the wide field-of-view mode, virtual images formed by display device 400 with the image light from emission surface 410 occupy first area 490 second area 492, and third area 494.

Third area 494 of the user's field-of-view is an area that can be occupied by ambient light transmitted through switchable window 416. When display device 400 is in the wide-field-of-view mode and switchable window 416 is in the opaque mode, third area 494 is only occupied by image light. When display device 400 is in the high resolution mode, third area 494 of the user's field-of-view is either dark or occupied by ambient light depending on whether switchable window 416 is in the opaque mode or the see-through mode, respectively.

Fourth area 496 of the user's field-of-view is occupied almost solely by ambient light when switchable window 416 is in the see-through mode. It is not occupied by either the image light or the ambient light when switchable window 416 is in the opaque mode.

As shown in FIG. 4A, first optical assembly 412 has a first edge 412-A and an opposing second edge 412-B. Second optical assembly 414 has a first edge 414-A and an opposing second edge 414-B. The first region 414-1 of second optical assembly 414 is adjacent to (e.g., touching or abutting) the first edge 414-A, while the second region 414-2 is adjacent to (e.g., touching or abutting) the second edge 412-B. Emission surface 410 has a first edge 410-A, proximate to the first edge 412-A of first optical assembly 412, and an opposing second edge 410-B. Second edge 412-B of second optical assembly 414 is proximate to the second edge 410-B of emission surface 410. Switchable window has a first edge 416-A adjacent to (e.g., touching or abutting) the second edge 410-B of emission surface and a second edge 416-B adjacent to (e.g., touching or abutting) the second edge 414-B of second optical assembly 414. In some embodiments, the first edge 410-A of emission surface 410, the first edge 412-A of first optical assembly 412, and the first edge 414-4 of second optical assembly 414 are connected to the frame 418. In some embodiments, one or more of the first region 412-1 of first optical assembly 412 and the first region 414-1 of second optical assembly 414 has a surface that is curved (e.g., spherical or aspherical). In some embodiments, one or more of the first region 412-1 of first optical assembly 412 and the first region 414-1 of second optical assembly 414 acts as a spherical lens or an aspheric lens to direct image light toward an eye of a user.

FIGS. 4B and 4C illustrate exemplary optical paths of image light and ambient light when display device 400 operates in the high resolution mode. As shown, emission surface 410 is configured to output image light (e.g., ray 420), which is directed towards eyebox 480 by first optical assembly 412 via a folded path. After being directed by first optical assembly 412, ray 420 is transmitted through the first region 414-1 of second optical assembly 414. Thus, image light (e.g., ray 420) is directed to eyebox 480 at the first optical power provided by first optical assembly 412.

When switchable window 416 is in the opaque mode, as shown in FIG. 4B, ambient light (e.g., rays 422, 424, 428) is blocked by switchable window from entering the interior space of display device 400. As shown in inset B, first area 490 of the user's field-of-view is occupied by image light (e.g., ray 420) output from emission surface 410. Second area 492, third area 494, and fourth area 496 of the user's field-of-view are dark.

When switchable window 416 is in the see-through mode, as shown in FIG. 4C, ambient light (e.g., rays 422, 424, 428) is transmitted through switchable window 416 into the interior space of display device 400.

In some embodiments, switchable window 416 is configured to transmit ambient light (e.g., rays 422, 424, and 428) toward the second region 414-2 of second optical assembly 414. The second region 414-2 of second optical assembly is configured to transmit the ambient light toward eyebox 480 at the third optical power. As shown in inset C, first area 490 of the user's field-of-view is occupied by image light (e.g., ray 420) output from emission surface 410. Second area 492 is not occupied by either image light or ambient light. Third area 494, and fourth area 496 of the user's field-of-view are occupied by ambient light (e.g., rays 422, 424) transmitted through switchable window 416.

Figure 4E:
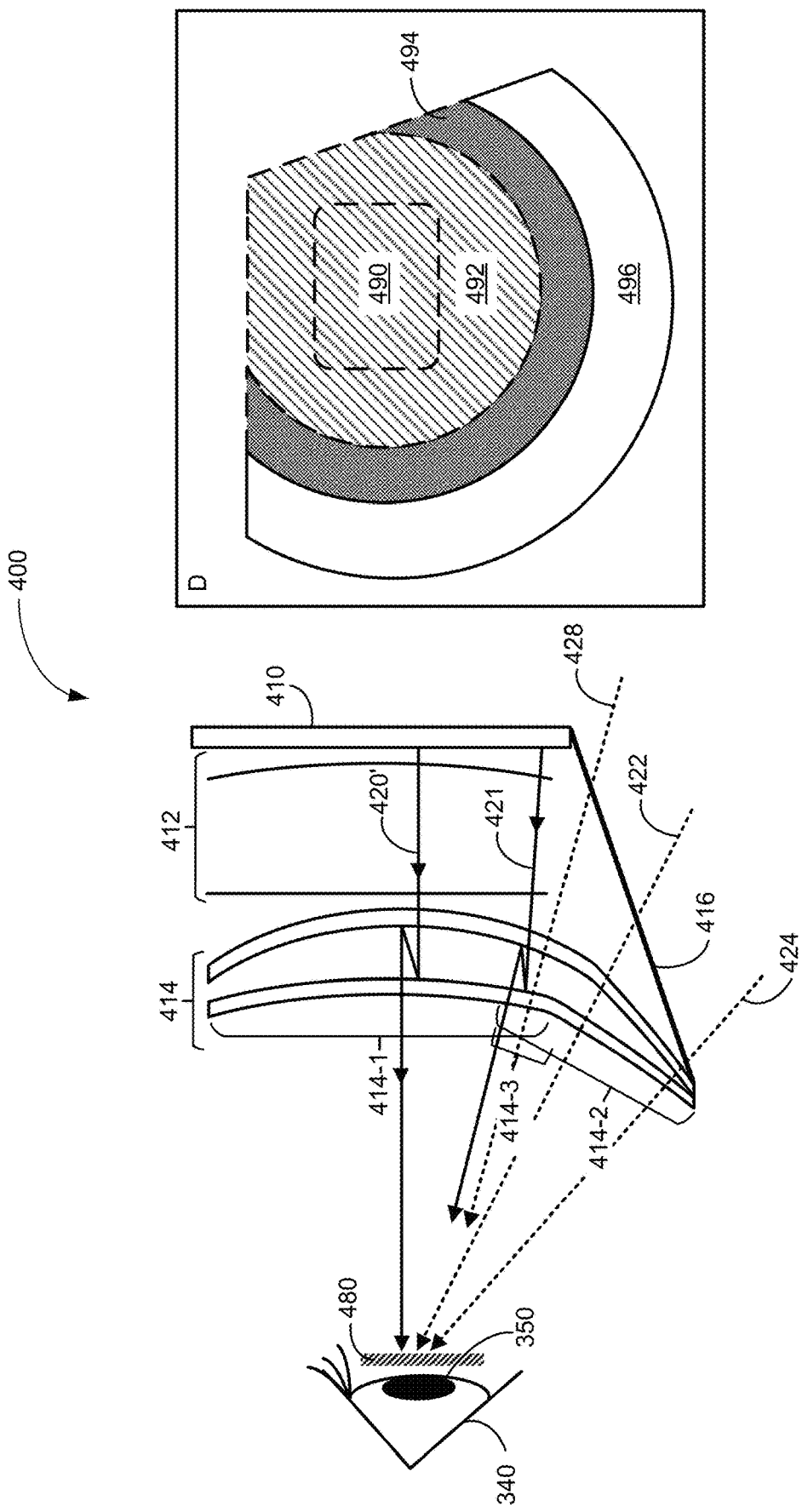

FIGS. 4D and 4E show optical paths of image light and ambient light when display device 400 operates in a wide field-of-view mode. Emission surface 410 is configured to output image light (e.g., rays 420' and 421). As shown, in the wide field-of-view mode, first optical assembly 412 is configured to transmit the image light without adding any optical power to the image light. After transmission through first optical assembly 412, the image light is directed towards eyebox 480 by the first region 414-1 of second optical assembly 414 via a folded path. Thus, the image light is directed to eyebox 480 at the second optical power.

When display device 400 is in the wide field-of-view mode and switchable window 416 is in the opaque mode, as shown in FIG. 4D, switchable window 416 is configured to block the ambient light from entering the interior space of display device 400. As shown in inset D, first area 490, second area 492, and third area 494 of the user's field-of-view are occupied by image light (e.g., ray 420') output from emission surface 410. Third area 494 and fourth area 496 of the user's field-of-view do not receive light since switchable window 416 is configured to block ambient light (e.g., rays 422, 424, and 428 are blocked by switchable window 416 and thus do not reach the user's eye).

When display device 400 is in the wide field-of-view mode and switchable window 416 is in the see-through mode, as shown in FIG. 4E, some ambient light (e.g., rays 422, 424, 428) is transmitted through switchable window 416 into the interior space of display device 400, and is transmitted by the second region 414-2 of second optical assembly 414 toward eyebox 480 at the third optical power, as described above. In some embodiments, when display device 400 operates in the wide field-of-view and switchable window 416 is in the see-through mode, at least a portion of the user's field-of-view can be used for AR applications. For example, a portion of a user's field-of-view that corresponds to the transition region 414-3 may receive image light (e.g., ray 421) from emission surface 410 as well as certain ambient light (e.g., ray 428). Thus, a portion of display device 400 (e.g., transition region 414-3) is AR-capable. In some embodiments, the AR-capabilities of the transition region 414-3 may be used to blend the real world (e.g., ambient light transmitted through switchable window 416) into the virtual world (e.g., one or more images displayed from emission source 410). In some embodiments, emission surface 410 is configured to block transmission of ambient light from entering the interior space of display device 400.

Inset E shows a field of view for a user's left eye when display device 400 is in the wide-field-of-view mode and switchable window 416 is in the opaque mode. As shown, first area 490 and second area 492 of the user's field-of-view receives image light (e.g., ray 420') output from emission surface 410. Third area 494 of the user's field-of-view receives image light (e.g., ray 421) output from a peripheral region of emission surface 410 as well as ambient light 428 transmitted through a switchable window 416. Thus, when display device 400 is in the wide-field-of-view mode and switchable window 416 is in the see-through mode, third area 494 of the user's field-of-view corresponds to an AR region that receives both image light and ambient light. Fourth area 496 of the user's field-of-view receives ambient light (e.g., rays 422 and 424) transmitted through a switchable window 416.

Figure 4G:
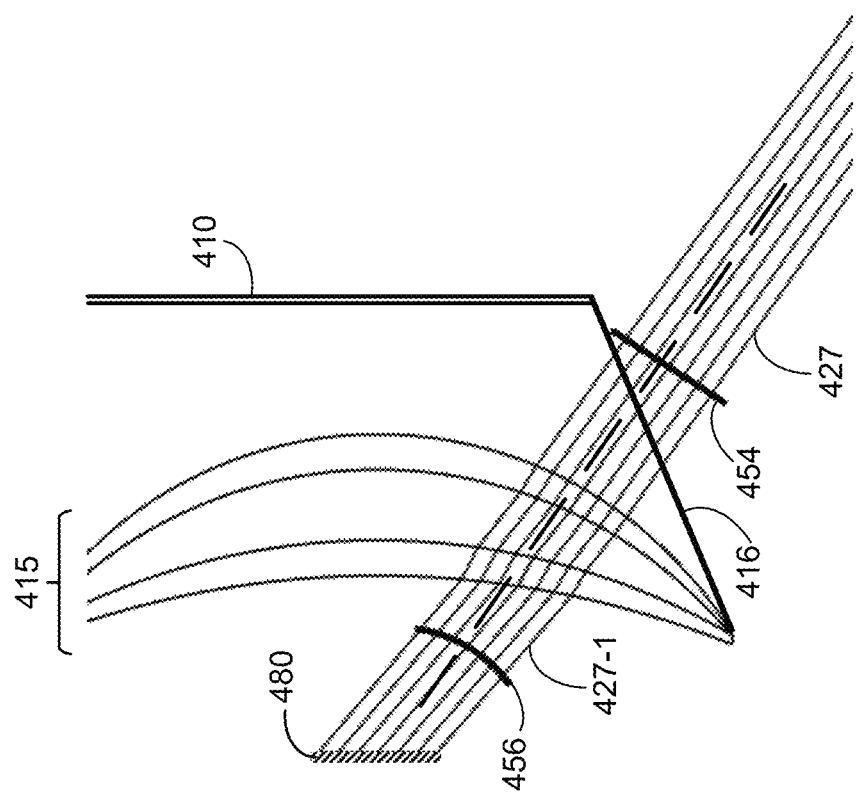
FIG. 4F-4G illustrates wave front of light transmitted through a display device in accordance with some embodiments.
Figure 4F:
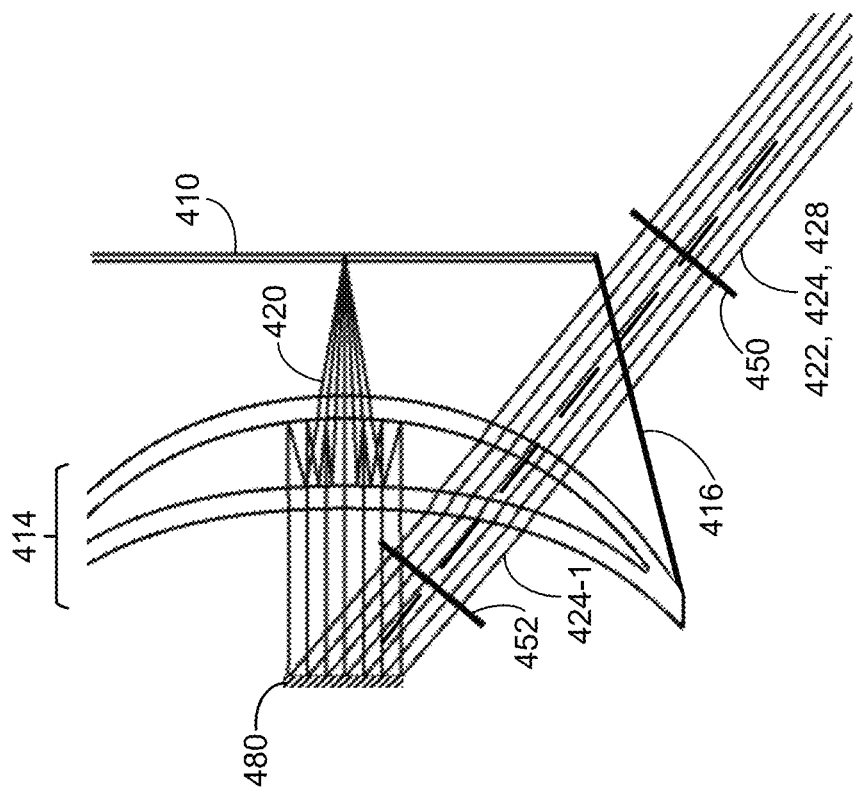

FIGS. 4F and 4G show a set of optical paths of ambient light (e.g., rays 422, 424, 428). As shown in FIG. 4F, one or more optical elements of second optical assembly 414 has a somewhat uniform thickness in the second region 414-2, allowing ambient light to be transmitted without introducing significant optical aberrations. As a result, ray 424 entering second optical assembly 414 as a plane wave with a linear wave front 450 would exit second optical assembly 414 as ray 424-1 with a linear wave front 452. In contrast, FIG. 4G shows an optical assembly 415 that is similar to second optical assembly 414 with the exception that optical assembly 415 includes one or more optical elements that do not have constant thickness, which may add optical aberrations to transmitted light (such as ray 427). As a result, ray 427 entering optical assembly 415 as a plane wave (with linear wave front 454) would leave optical assembly 415 as ray 427-1, which is aberrated and is no longer a plane wave, evidenced by the non-linear (e.g., curved) wave front 456.

Figure 5A:
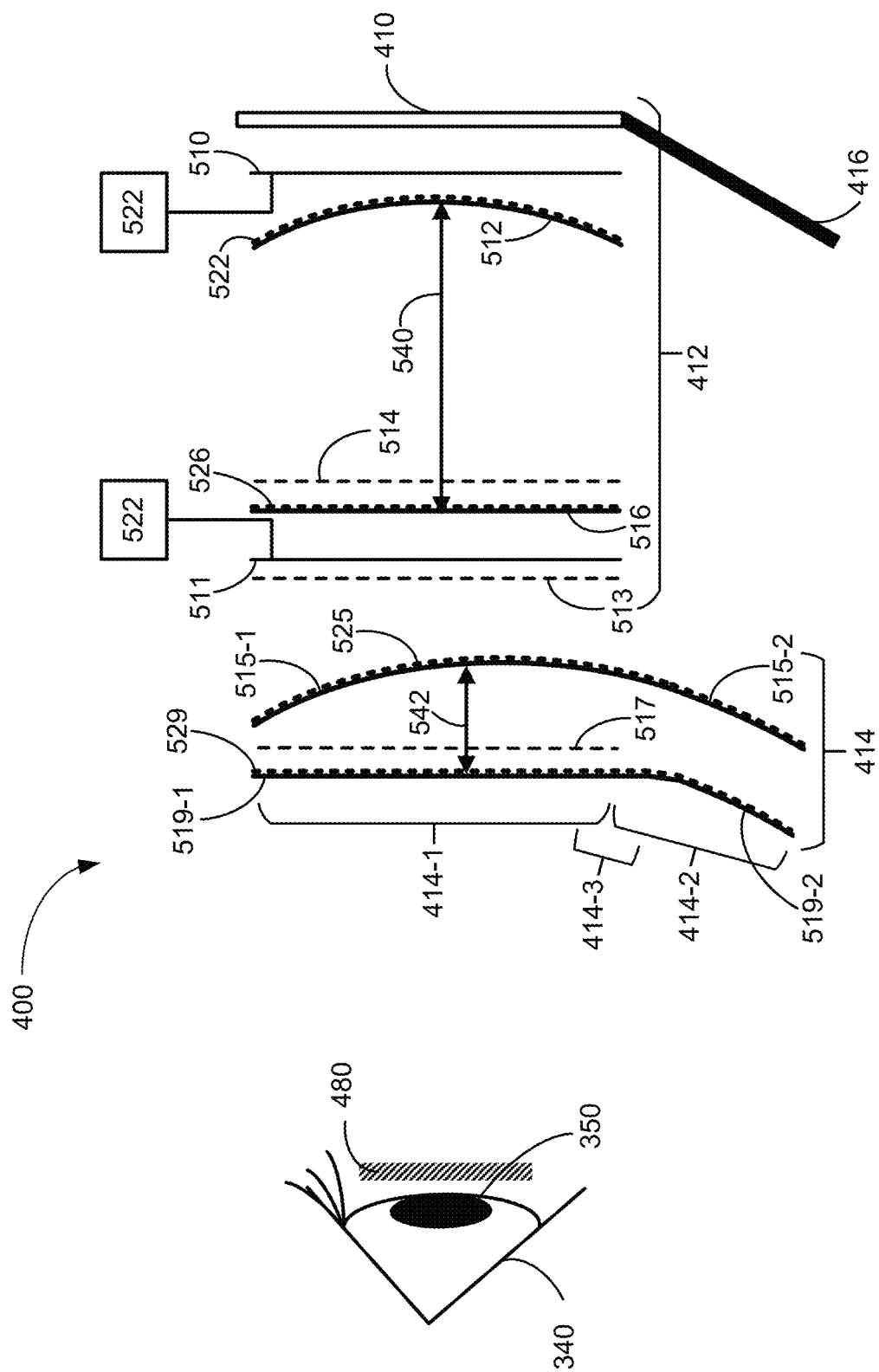
FIG. 5A illustrates a display device in accordance with some embodiments.

FIG. 5A illustrates an exemplary implementation of display device 400 in accordance with some embodiments. For example, first optical assembly 412 (e.g., a pancake lens assembly) includes:
  a first switchable optical retarder 510 (e.g., a switchable half wave plate) coupled to controller 520,
  a second switchable optical retarder 511 (e.g., a switchable half wave plate) coupled to controller 522,
  a first beam splitter 512 (e.g., a 50/50 mirror),
  a first optical retarder 514 (e.g., a quarter wave plate),
  a second optical retarder 513 (e.g., a quarter wave plate), and
  a first reflector 516.

First beam splitter 512 and first reflector 516 are spaced apart by a first distance 540. First switchable optical retarder 510 and second switchable optical retarder 511 are configurable to be in one of an "off" state or an "on" state. In the "on" state, first switchable optical retarder 510 is configured to receive incident light and transmit the incident light without changing the polarization of the incident light. In the "off" state, first switchable optical retarder 510 is configured to receive incident light and to convert the polarization of the incident light to an orthogonal (e.g., opposite) polarization. For example, when first switchable optical retarder 510 is in the "off" state, left circularly polarized (LCP) light is transmitted through first switchable optical retarder 510 as right circularly polarized (RCP) light. In some embodiments, first reflector 516 is a polarizing reflector that is configured to reflect light having a first linear polarization and transmit light having a second linear polarization. In some embodiments, first beam splitter 512 in may have a 50% transmission/50% reflection coating 522, and/or first reflector 516 may have a polarizing reflective coating 526. Optical retarder 514 may also be a thin film formed on a surface of second reflector 519 or a surface of beam splitter 513. In some embodiments, first optical assembly 412 may have a first curvature, which contributes to the first optical power. For example, first beam splitter 512 may have a first curvature that corresponds to the first optical power. In some embodiments, such as when first beam splitter 512 or first reflector 516 has a curvature, distance 540 refers to the maximum distance between a surface of first beam splitter 512 and a surface of first reflector 516.

Although FIG. 5A shows that second optical retarder 513 is located between second switchable optical retarder 511 and second optical assembly 414, in some embodiments, second optical retarder 513 may be located between first reflector 516 and second switchable optical retarder 511 without negatively impacting the operation of display device 400 or the performance of display device 400.

In some embodiments, one or more of first optical retarder 514, second optical retarder 513, first reflector 516, second switchable optical retarder 511, and second optical retarder 513 may be formed on a same substrate and/or in a single laminated surface.

For example, second optical assembly 414 (e.g., a pancake lens assembly) includes:
  a second beam splitter 515 (e.g., a 50/50 mirror),
  a third optical retarder 517 (e.g., a quarter wave plate), and
  a second reflector 519.

In some embodiments, second reflector 519 is a polarizing reflector that is configured to reflect light having the second linear polarization and transmit light having the first linear polarization. As discussed above, second optical assembly 414 has a first region 414-1 and a second region 414-2. Accordingly, one or more optical components (e.g., second beam splitter 515, third optical retarder 517, second reflector 519) of second optical assembly 414 also has a first section (e.g., first section 515-1 of second beam splitter 515, first section 517-1 of second optical retarder 517, and first section 519-1 of second reflector 519) corresponding to the first region 414-1 of second optical assembly 414 and a second section (e.g., second section 515-2 of second beam splitter 515, second section 517-2 of second optical retarder 517, and second section 519-2 of second reflector 519) corresponding to the second region 414-2 of second optical assembly 414. First section 515-1 of second beam splitter 515 and first section 519-1 of second reflector 519 are spaced apart by a second distance 542. In some embodiments, second distance 542 is different from and smaller than first distance 540. In some embodiments, first distance 540 and second distance 542 may have a ratio between 1.5:1 and 4:1.

In some embodiments, as shown in FIG. 5A, second beam splitter 515 may have a 50% transmission/50% reflection coating 525, and/or second reflector 519 may have a polarizing reflective coating 529. In some embodiments, third optical retarder 517 may be a thin film formed on a surface of second reflector 519 or second beam splitter 515. In some embodiments, one or more coatings or thin films (e.g., coatings 525, 529) extends across both the first region 414-1 and the second region 414-2 of second optical assembly 414, so that both the image light (e.g., ray 420) and ambient light (e.g., rays 422, 424, 428) can travel through the one or more coatings or thin films. In some embodiments, one or more coatings or thin films in the first region 414-1 may gradually transition to one or more different coatings or thin films or taper off to no coating or thin film in the second region 414-2 (e.g., second beam splitter 515 may have coating 525 that is 50% transmission/50% reflection in the first section 515-1 that may gradually taper off to 80% transmission/20% reflection and second reflector 519 may have coating 529 that is reflective in the first section 519-1 that may gradually taper to an antireflective coating or no coating in at least a part of the second section 519-2). In some embodiments, an optical component (e.g., second beam splitter 515) of second optical assembly 414 may have a second curvature in the first region 414-1, which contributes to the optical power of the first region 414-1. For example, second beam splitter 515 may have a second curvature that corresponds to the first optical power. In some embodiments, such as when the first section 515-1 of second beam splitter 515 or the first portion 519-1 of second reflector 519 has a curvature, distance 542 refers to the maximum distance between a surface of the first section 515-1 of second beam splitter 515 and a surface of first section 519-1 of second reflector 519. In some embodiments, the curvature of the optical component may gradually change to have a third curvature, different from the second curvature, or no curvature in at least part of the second region 414-2. For example, first section 515-1 of second beam splitter 515 may have a second curvature corresponding to the second optical power and the curvature of the second beam splitter 515 may gradually and continuously transition to a third curvature corresponding to the third optical power or to being flat in at least part of the second section 515-2 of second beam splitter 515.

In some embodiments, the optical components of second region 414-2 of second optical assembly 414 have no curvature. In some embodiments, the optical components of second region 414-2 of second optical assembly 414 have curvatures that sum to a total optical power of zero. In some embodiments, the second section 515-2 of second beam splitter 515 is configured to reflect at least 50% of incident light. For example, the second section 515-2 of second beam splitter 515 may have one or more of a 50% transmission/ 50% reflection, 60% transmission/40% reflection, 70% transmission/30% reflection, 80% transmission/20% reflection, or 90% transmission/10% reflection coating. In some embodiments, the second section 515-2 of second beam splitter 515 may allow ~100% transmission. For example, the second section 515-2 of second beam splitter 515 may be uncoated or may have coating that allows ~100% transmission. In some embodiments, second beam splitter 515 may have a 50% transmission/50% reflection coating in the first section 515-1 that gradually tapers to a different ratio in the second section 515-2.

In some embodiments, not shown, second reflector 519 includes a polarizing reflector film or coating 529 in the first region 414-2 of second optical assembly 414 that does not extend to at least part of the second region 414-2. Thus, ambient light (e.g., ray 422, 424) entering through switchable window 416 does not experience the effect of the polarizing reflector film or coating 529. In some embodiments, one or more optical components in second optical assembly 414 are formed on a same optical element or substrate that extends across both the first region 414-1 and the second region 414-2 of second optical assembly 414. For example, first section 515-1 of second beam splitter 515 and second section 515-2 of second beam splitter 515 may be formed with a single piece of optical material or on the same substrate.

In some embodiments, second optical assembly 414 abruptly transitions from the first region 414-1 to the second region 414-2. For example, one or more coatings in the first region 414-1 may end abruptly near the intersection of the first region 414-1 or the second region 414-2, or somewhere in the transition region 414-3 (e.g., first section 515-1 of second beam splitter 515 may have a 50% transmission/50% reflection coating and second section 515-2 of second beam splitter 515 may allow ~100% transmission of light either by not having a coating or having a different coating than first section 515-1). In another example, an optical component in second optical assembly 414 may have a second curvature in the first region 414-1 the curvature of the optical component may abruptly change to a third curvature different from the second curvature in the second region 414-2. For instance, first section 515-1 of second beam splitter 515 may have a second curvature corresponding to the second optical power and second section 515-2 of second beam splitter 515 may have a third curvature corresponding to the third optical power such that the transition from the second curvature to the third curvature may be discontinuous. In some embodiments, an optical component in second optical assembly 414 may have a first flat surface in the first section 414-1 and a second flat surface in the second section 414-2, but the second flat surface is angled with respect to the first flat surface. For example, the first section 519-1 of second reflector 519 may have a first flat surface and the second section 519-2 of second reflector 519 may have a second flat surface. The second flat surface the second section 519-2 forms an angle with the first flat surface in the first section 519-1 so that the first flat surface is substantially parallel to the second section 515-2 of second beam splitter 515. Thus, ambient light going through the second section 515-2 of second beam splitter 515 and the second flat surface of second region 519-2 of second reflector 519 would reach the user's eye 340 with little or no optical aberration. In some embodiments, an optical component in second optical assembly 414 may only be present in the first region 414-1 or the second region 414-2. For example, second beam splitter 515 may not extend to at least some part of the second region.

In some embodiments, an optical component of second optical assembly 414 may include two distinct optical elements, each in either first region 414-1 or second region 414-2, that have been joined. For example, first section 515-1 of second beam splitter 515 may be a first optical element and second section 515-2 of second beam splitter 515 may be a second optical element, distinct from the first optical element. The two optical elements may be joined or combined to create second beam splitter 515 that has a first section 515-1 and a second section 515-2.

Figure 5B:
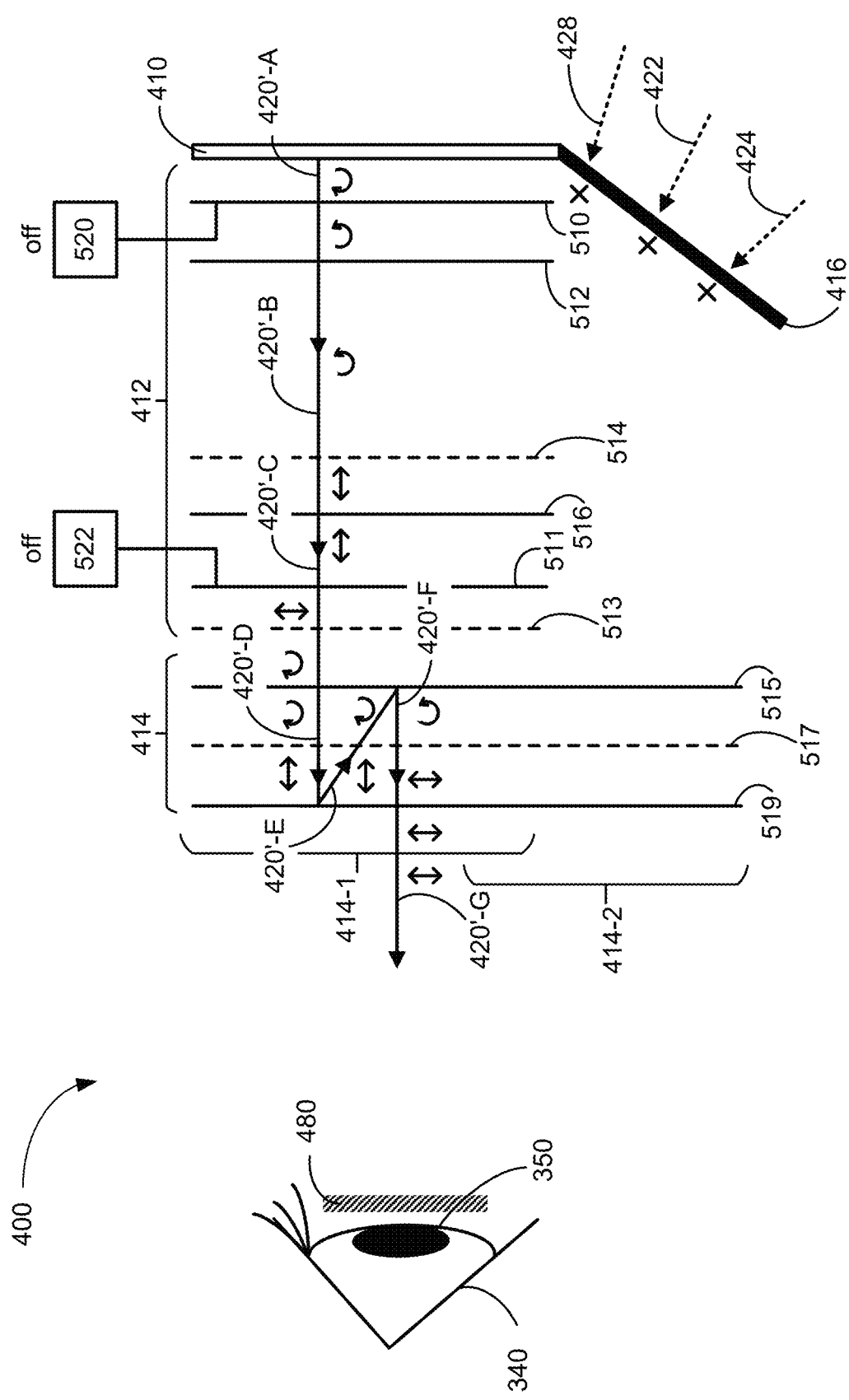
FIGS. 5B-5G illustrate optical paths of light in a display device in accordance with some embodiments.
Figure 5C:
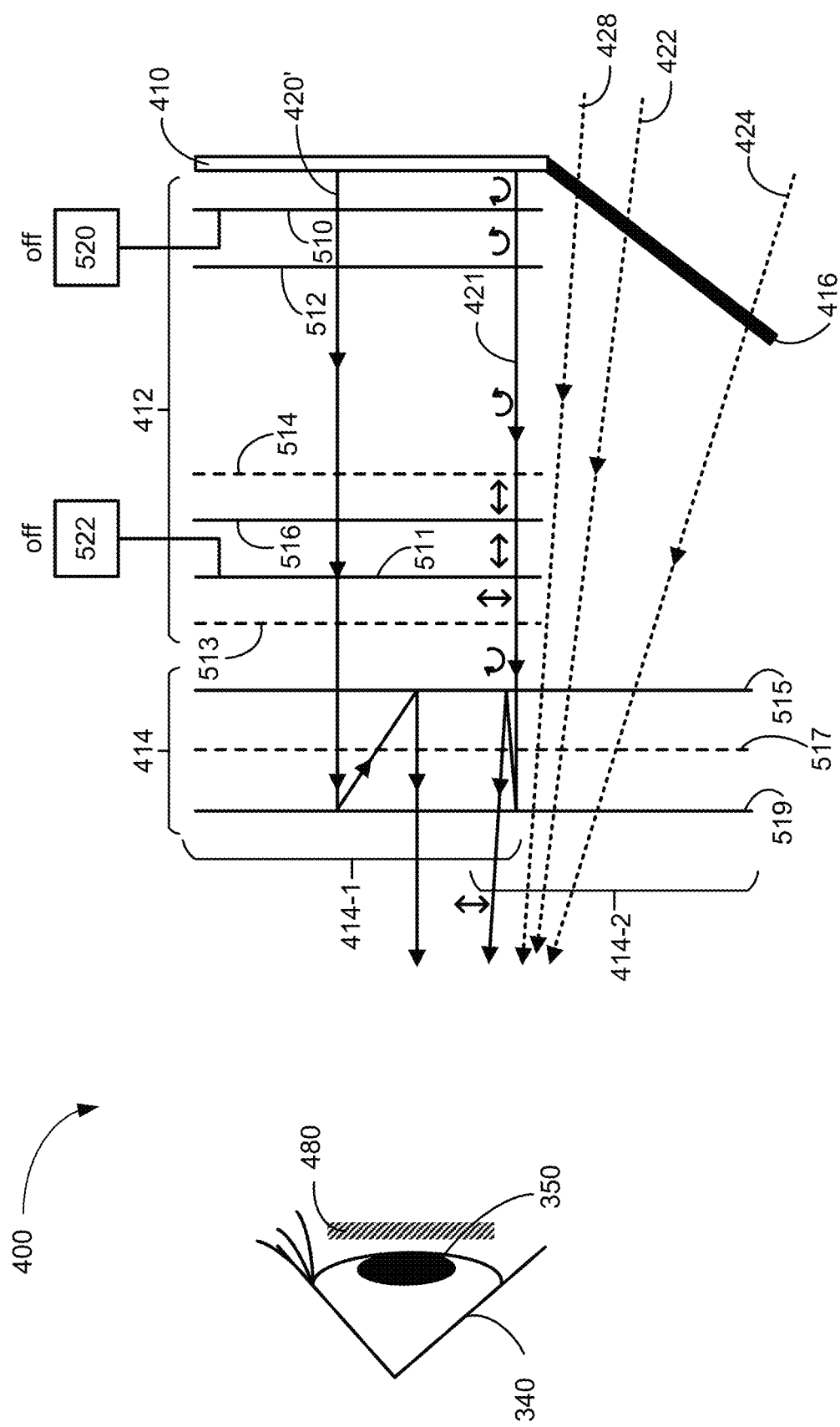

FIGS. 5B-5G illustrate optical paths of light in display device 400 in accordance with some embodiments. FIGS. 5B-5C show display device 400 operating in the wide field-of-view mode.

FIG. 5B shows the optical path of image light (e.g., ray 420'), output by emission source 410 when display device 400 is in the wide field-of-view mode. Emission surface 410 outputs image light (e.g., ray 420'-A) having a first circular polarization. When display device is in the wide field-of-view mode, first switchable optical retarder 510 is in the "off" state. First switchable optical retarder 510 receives ray 420'-A having the first circular polarization. First switchable optical retarder 510, in the "off" state, is configured to convert ray 420'-A to a second circular polarization that is orthogonal to the first circular polarization. First beam splitter 512 is configured to receive ray 420'-A, having the second circular polarization, and output at least a portion of ray 420'-A, having the second circular polarization, as ray 420'-B toward optical retarder 514. Optical retarder 514 is configured to convert ray 420'-B, having the second circular polarization, to a first linear polarization. First reflector 516 is configured to receive ray 420'-B, having the first linear polarization, and to transmit at least a portion of ray 420'-B, having the first linear polarization, as ray 420'-C, having the first linear polarization, toward second optical assembly 414.

Second switchable optical retarder 511, in the "off" state, is configured to convert ray 420'-C, having the first linear polarization to a second linear polarization that is orthogonal to the first linear polarization. First optical retarder 513 is configured to convert ray 420'-C, having the second linear polarization to the first circular polarization. Second beam splitter 515 is configured to transmit at least a portion of ray 420'-C, having the first circular polarization, as ray 420'-D toward optical retarder 517. Third optical retarder 517 is configured to convert ray 420'-D, having the first circular polarization, to the first linear polarization. First reflector 516 is configured to reflect at least a portion of ray 420'-D as ray 420'-E, having the first linear polarization, toward second beam splitter 515. Third optical retarder 517 is configured to convert ray 420'-E to the first circular polarization. Second beam splitter 515 is configured to reflect at least a portion of ray 420'-E, having the first linear polarization, as ray 420'-F, having the second circular polarization, toward second reflector 519. Third optical retarder 517 is configured to convert ray 420'-F to the second linear polarization. Second reflector 519 is configured to transmit at least a portion of ray 420'-F as ray 420'-G, having the second linear polarization, toward eyebox 480.

As shown in FIG. 5B, switchable window 416 is in the opaque mode. Thus, ambient light (e.g., rays 422, 424, 428) is blocked from entering the interior space of display device 400.

Referring to FIG. 5C, display device 400 is in the wide field-of-view mode and switchable window 416 is in the see-through mode. Thus, switchable window 416 is configured to transmit at least a portion of light ambient light (e.g., rays 422, 424, 428). The optical path of ambient light transmitted through switchable window 416 is described below with respect to FIGS. 5F and 5G. When display device 400 is in the see-through mode, display device 400 is capable of also being in an AR application. As shown, image light (e.g., ray 421) and light transmitted through switchable window 416 (e.g., ray 428) are directed toward eyebox 480 such that rays 421 and 428 have the same direction after passing through second optical assembly 414 and can be perceived by the user as coming from a same source. The optical path and polarization of ray 421 corresponds to (e.g., is the same as) the optical path of ray 420' (e.g., rays 420'-A to 420'-G collectively), described above with respect to FIG. 5B, and is not repeated here for brevity. The optical path of ray 428 is described below with respect to FIGS. 5F and 5G.

Figure 5D:
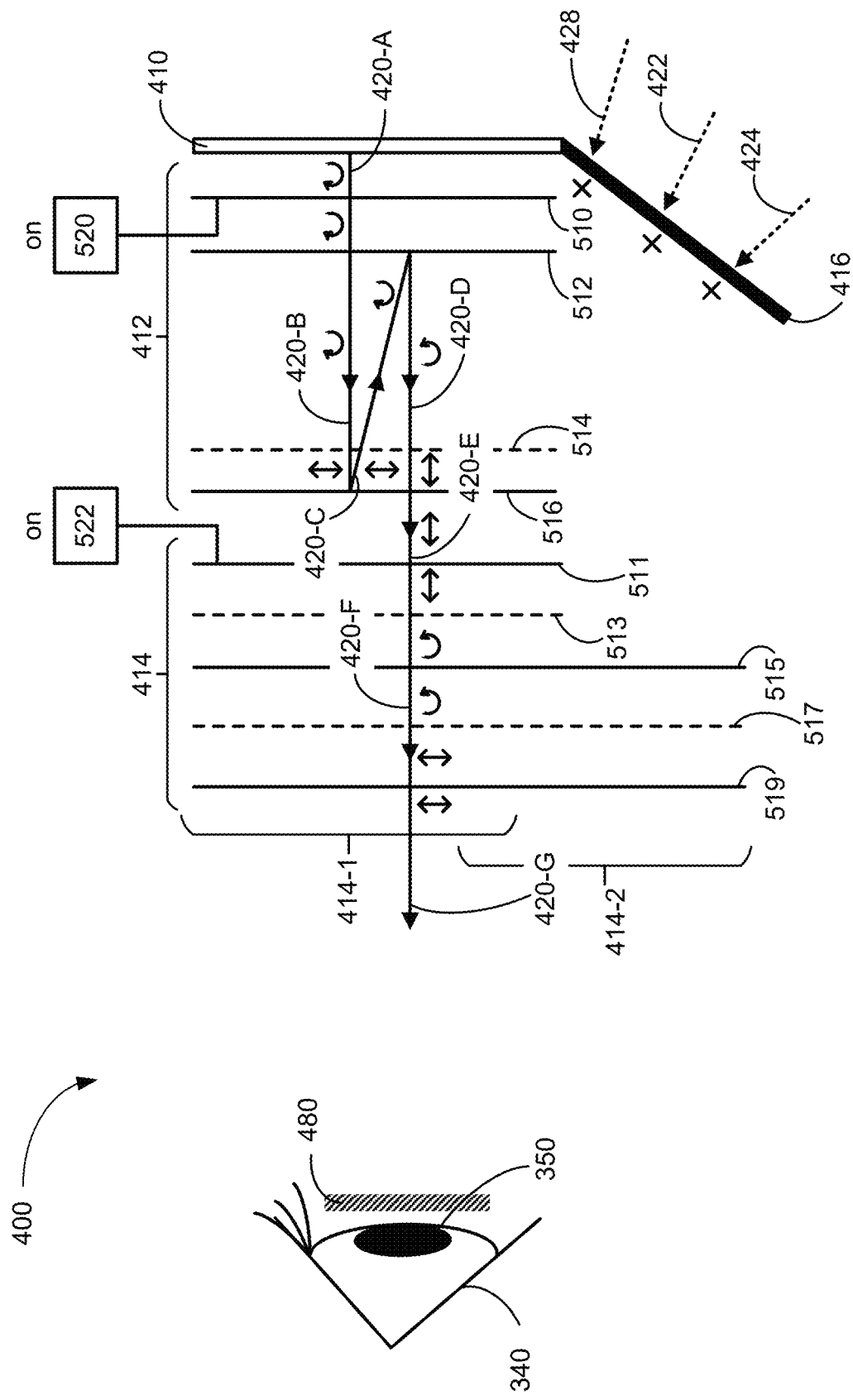
Figure 5E:
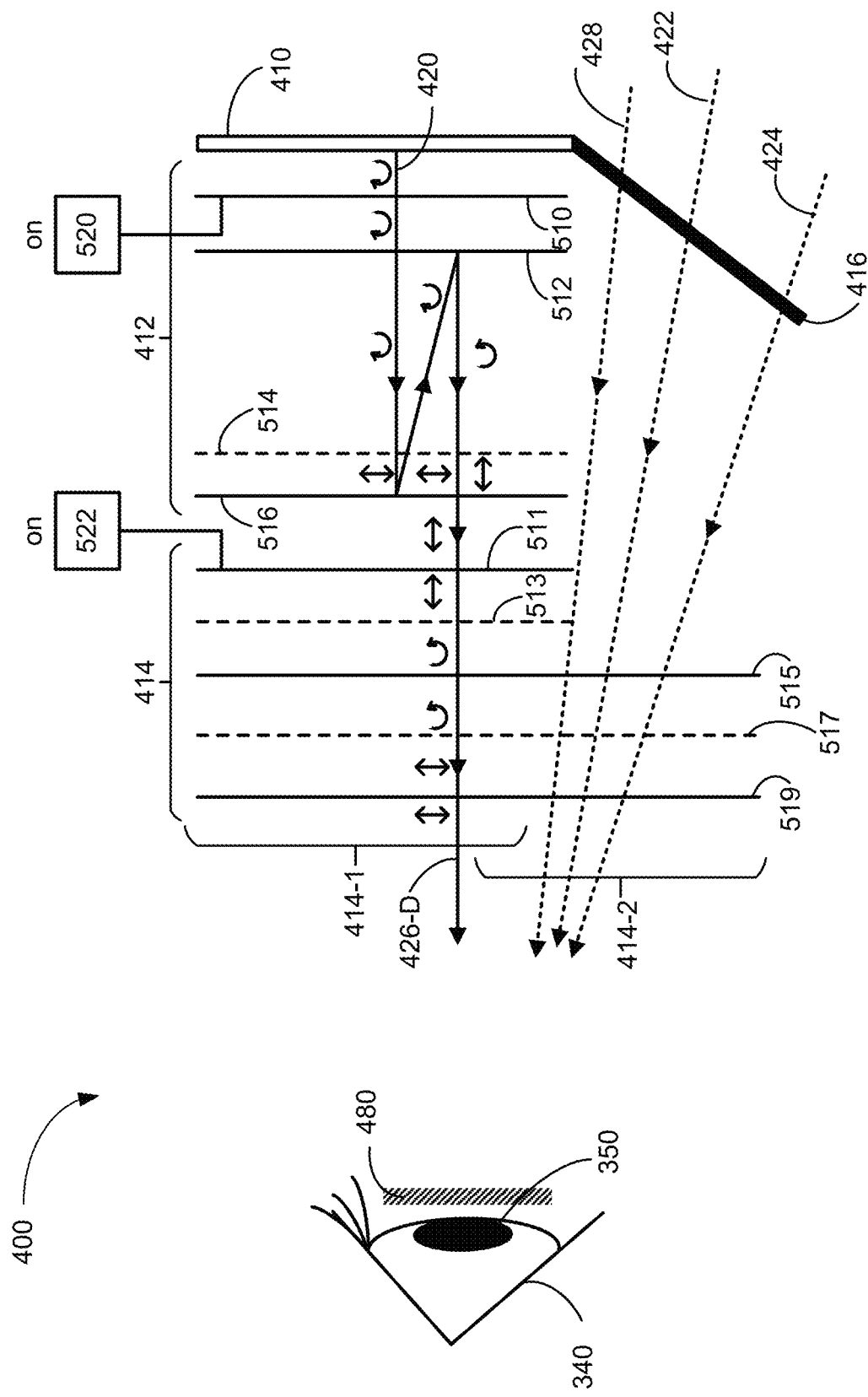

FIGS. 5D and 5E show display device 400 operating in the high resolution mode. FIG. 5D shows the optical path of image light (e.g., ray 420), output by emission source 410, when display device 400 is in the high resolution mode. Emission surface 410 outputs image light (e.g., ray 420-A) having the first circular polarization. When display device is in the high-resolution mode, first switchable optical retarder 510 is in the "on" state. First switchable optical retarder 510 transmits ray 420-A having the first circular polarization without changing the polarization. First beam splitter 512 is configured to transmit at least a portion of ray 420-A, having the first circular polarization, as ray 420-B toward optical retarder 514. Optical retarder 514 is configured to convert ray 420-B, having the first circular polarization, to the second linear polarization. First reflector 516 is configured to reflect at least a portion of ray 420-B as ray 420-C, having the second linear polarization, toward first beam splitter 512. Optical retarder 514 is configured to convert ray 420-C to the first circular polarization. First beam splitter 512 is configured to reflect at least a portion of ray 420-C as ray 420-D, having the second circular polarization, toward first reflector 516. Optical retarder 516 is configured to convert ray 420-D, having the second circular polarization, to the first linear polarization. First reflector 516 is configured to transmit at least a portion of ray 420-D as ray 420-E, having the first linear polarization, toward second optical assembly 414. Second switchable optical retarder 511, in the "off" state is configured to transmit ray 420-E without changing the polarization. First optical retarder 513 is configured to convert ray 420-E to the second circular polarization. Second beam splitter 515 is configured to transmit at least a portion of ray 420-E, having the second circular polarization, as ray 420-F toward third optical retarder 517. Third optical retarder 517 is configured to convert ray 420-F, having the second circular polarization, to the second linear polarization. First reflector 516 is configured to transmit at least a portion of ray 420-F as ray 420-G, having the second linear polarization, toward eyebox 480.

Referring to FIG. 5D, display device 400 is set in the high resolution mode and switchable window 416 is in the opaque mode. Thus, ambient light (e.g., rays 422, 424, 428) is blocked (e.g., switchable window 416 blocks ambient light from entering the interior space of display device 400).

Referring to FIG. 5E, display device 400 is set in the high resolution mode and switchable window 416 is in the see-through mode. Thus, switchable window 416 is configured to transmit at least a portion of light ambient light (e.g., rays 422, 424, 428). The optical path of ambient light (e.g., rays 422 and 424), transmitted through switchable window 416, is described below with respect to FIGS. 5F and 5G.

Figure 5F:
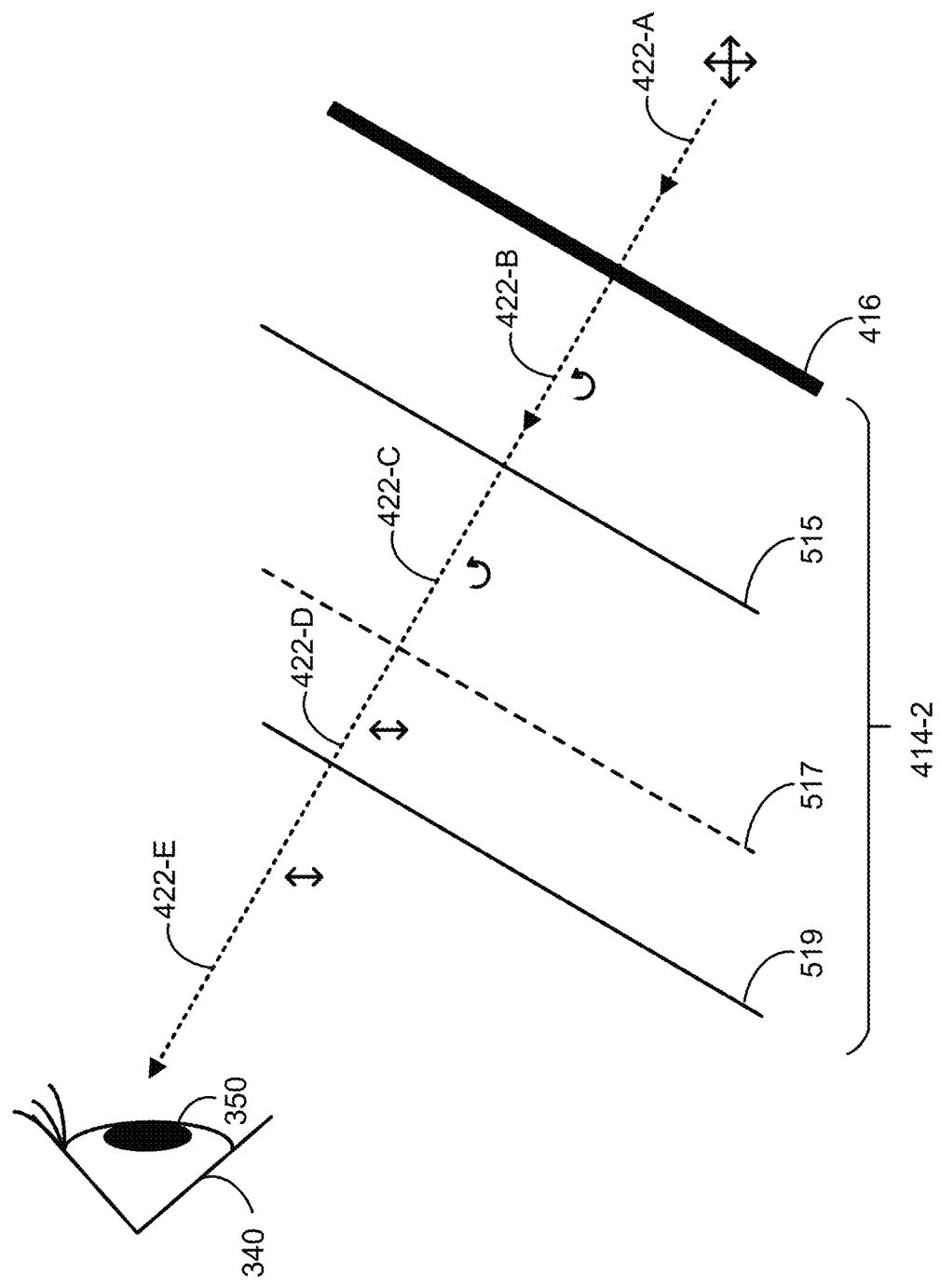
Figure 5G:
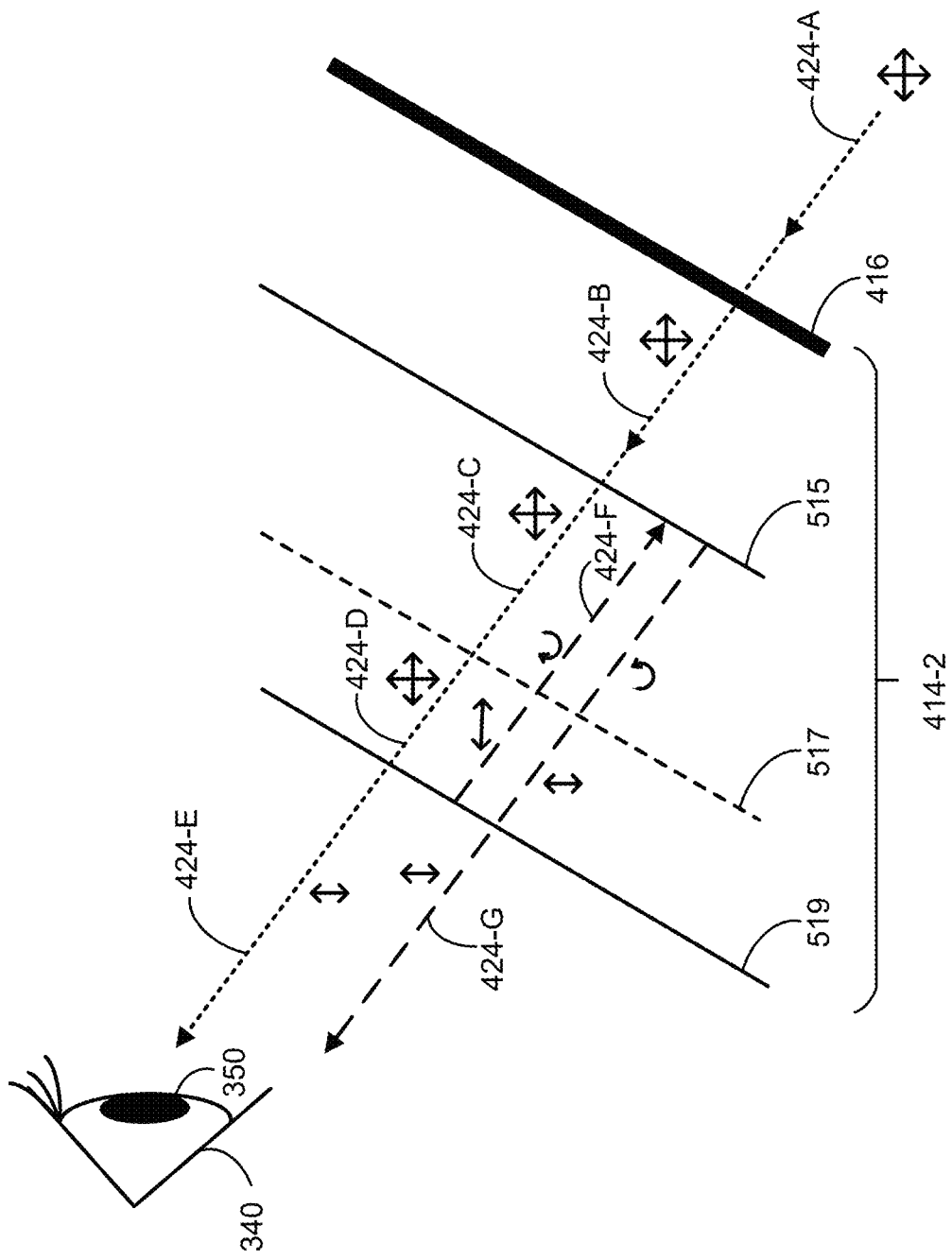

FIGS. 5F and 5G show the optical path of ambient light (e.g., rays 422, 424, 428) when switchable window 416 is in the see-through mode. FIG. 5F illustrates the optical path of ambient light (e.g., ray 422) in accordance with some embodiments. The second section 515-2 of second beam splitter 515, corresponding to the second region 414-2 of second optical assembly 414; the second section 517-2 of optical retarder 517, corresponding to the second region 414-2 of second optical assembly 414; and the second section 519-2 of second reflector 519, corresponding to the second region 414-2 of second optical assembly 414, are shown.

In some embodiments, as shown in FIG. 5F, switchable window 416, in the see-through mode, may also act as a polarizer and transmit at least a portion of the unpolarized external ambient light (e.g., ray 422-A) as ray 422-B having the second circular polarization. Alternatively, as shown in FIG. 5G, switchable window 416, in the see-through mode, may transmit at least a portion of the unpolarized external ambient light (e.g., ray 424-A) as ray 424-B that is unpolarized after passing through switchable window 416. Details regarding the switchable window can be found in U.S. patent application Ser. No. 16/209,909, filed on Dec. 4, 2018, entitled "Display Device with a Switchable Window and See-Through Pancake Lens Assembly," which is incorporated by herein in its entirety.

Referring to FIG. 5F, switchable window 416, in the see-through mode, transmits at least a portion of external light (e.g., ray 422-A) into the housing or interior space of display 400 as ray 422-B having the second circular polarization. The second section 515-2 of second beam splitter 515 is configured to transmit at least a portion of ray 422-B as ray 422-C. The second section 517-2 of third optical retarder 517 is configured to convert ray 422-C, having the second circular polarization, to ray 422-D having the second linear polarization. The second section 519-2 of second reflector 519 is configured to transmit at least a portion of ray 422-D as ray 422-E having the second linear polarization. Thus, unlike the optical path of the image light (e.g., ray 420') through the first region 414-1 of second optical assembly 414, the optical path of the ambient light (e.g., ray 422), represented by rays 422-A through 422-E, does not have any folds in its optical path. As a result, ambient light (e.g., ray 422) is transmitted to the user's eyes 340 with minimal or reduced optical aberrations (e.g., optical power, focus, astigmatism, and/or distortion). In some embodiments, ambient light (e.g., ray 422) is transmitted to the user's eyes 340 such that the second region 414-2 of second optical assembly 414 does not add optical aberrations to the ambient light. In some embodiments, the second region 414-2 of second optical assembly 414 does no add optical power to the ambient light.

Referring to FIG. 5G, switchable window 416, in the see-through mode transmits at least a portion of unpolarized external light (e.g., ray 424-A) into the housing or interior space as unpolarized ray 424-B. The second section 515-2 of second beam splitter 515 is configured to transmit at least a portion of ray 424-B as unpolarized ray 424-C, which is then transmitted through the second section 517-2 of third optical retarder 517 as unpolarized ray 424-D. The second section 519-2 of second reflector 519 is configured to transmit at least a portion of unpolarized ray 424-D as ray 424-E that has the second linear polarization. In some embodiments, the second section 519-2 of second reflector 519 may reflect a portion of ray 424-D and the reflected ray would reach the second section 515-2 of second beam splitter 515 as ray 424-F. In such cases, a portion of ray 424-F may be reflected back towards the user's eye 340 at second section 515-2 of second beam splitter 515 and eventually become ray 424-G after passing through second reflector 519-2. Ray 424-G may travel towards the user's eye 340 and enter the pupil 350 as stray light. In order to reduce or mitigate stray light entering the eye, a coating 525 of second beam splitter 515 may be tapered towards the second edge 414-B of second optical assembly 414. Examples of a tapered coating are discussed above with respect to FIG. 5A. The optical path of the external light represented by rays 424-A through 424-E does not include any folds in its optical path. In some embodiments, ambient light (e.g., ray 424) is transmitted to the user's eyes 340 such that optical aberrations (e.g., optical power, focus, astigmatism, and/or distortion) are reduced, minimized, or eliminated. In some embodiments, ambient light (e.g., ray 424) is transmitted to the user's eyes 340 such that the second region 414-2 of second optical assembly 414 does not add optical aberrations to the external light. In some embodiments, the second region 414-2 of second optical assembly 414 does not add optical power to the ambient light.

Figure 6:
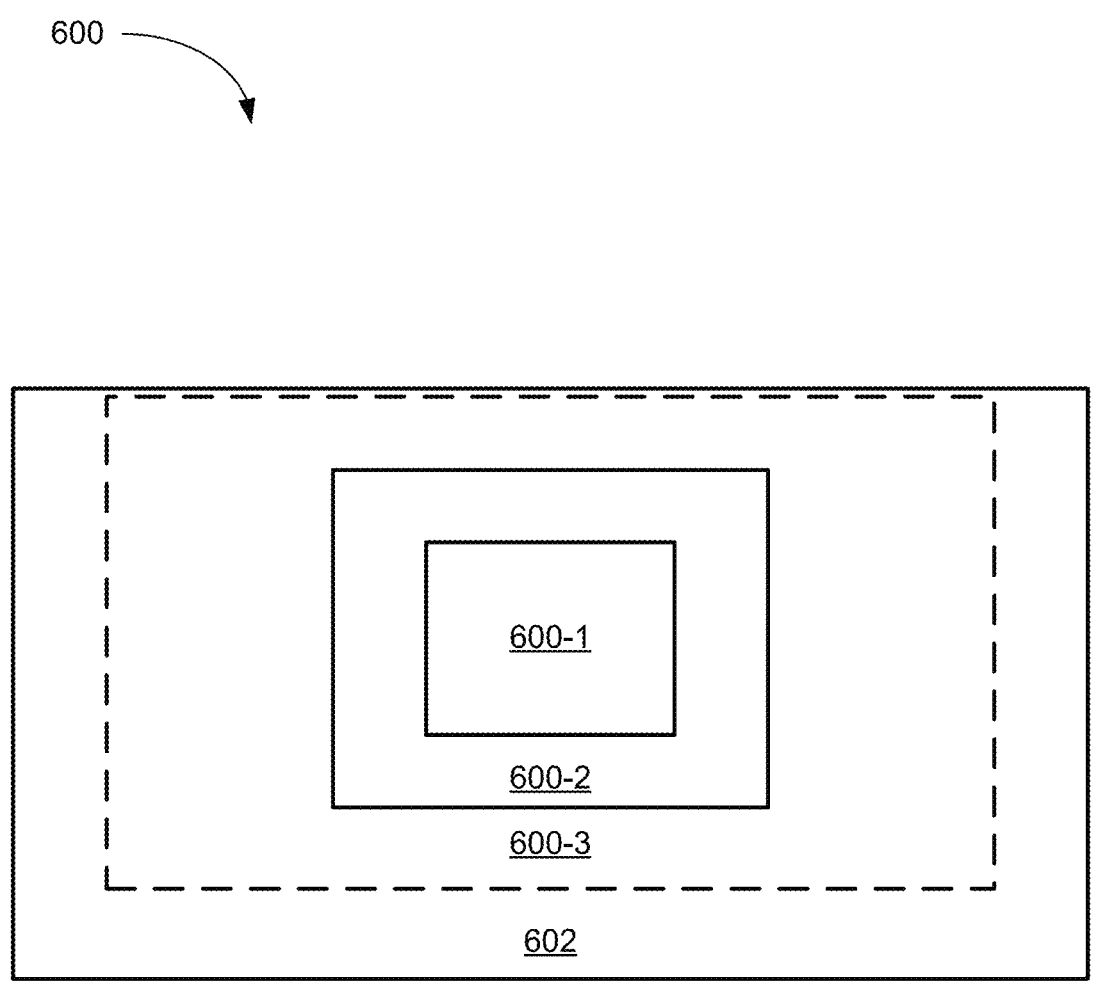
FIG. 6 is a block diagram illustrating an example of various field of views provided by a display device in accordance in some embodiments.

FIG. 6 is a block diagram illustrating an example of various field of views (e.g., user's binocular visual field 600, where user's left eye field-of-view and right eye field-of-view are superimposed with one another to form a single and cohesive visual field) provided by a display in accordance in some embodiments. Portions 600-1 and 600-2 of the binocular visual field 600 are virtual reality regions. In some embodiments, portion 600-2 can be part of a see-through region when display device 400 operates in the high-resolution mode and switchable window 416 is in the see-through mode. Portion 600-3 of the binocular visual field 600 may be a virtual reality region, an AR region, or part of a see-through region, depending on the mode of operation of display device 400 and the mode of the switchable window 416. Portion 602 of the binocular visual field 600 is a see-through region. When switchable window 416 is in the see-through mode, portion 602 of binocular visual field 600 is occupied with ambient light (e.g., rays 422, 424, 428), transmitted through switchable window 416, in. When switchable window 416 is in the opaque mode, ambient light is blocked from entering the interior space of display device 400 by switchable window 416 and thus, portion 602 of binocular visual field 600 does not receive light.

When display device 400 is in the wide field-of-view mode, portions 600-1, 600-2, and 600-3 of binocular visual field 600 is occupied with image light (e.g., ray 420) output from emission surface 410 of display device 400, transmitted through the first region 412-1 of first optical assembly 412, and directed by first region 414-1 of second optical assembly 414.

When display device 400 is in the wide field-of-view mode and in an AR application, portion 600-3 is an AR application region where the user sees both image light (e.g., ray 421) output from emission surface 410 as well as ambient light (e.g., ray 428) that has been transmitted through switchable window 416.

When display device 400 is in the wide field-of-view mode and is not in an AR application (e.g., switchable window 416 is in the opaque mode), portion 600-3 corresponds to a virtual reality region. Thus, portion 600-3 is occupied with image light (e.g., ray 421).

When display device 400 is in the high resolution mode, portion 600-1 of binocular visual field 600 is occupied with image light (e.g., ray 420). When switchable window 416 is in the see-through mode, ambient light (e.g., rays 422, 424, 428) is transmitted through switchable window 416 and portions 600-2, 600-3, and 602 of the binocular visual field 600 are occupied with ambient light. When switchable window 416 is in the opaque mode, ambient light is blocked from entering the interior space of display device 400 and portions 600-2, 600-3, and 602 are dark.

Figure 7A:
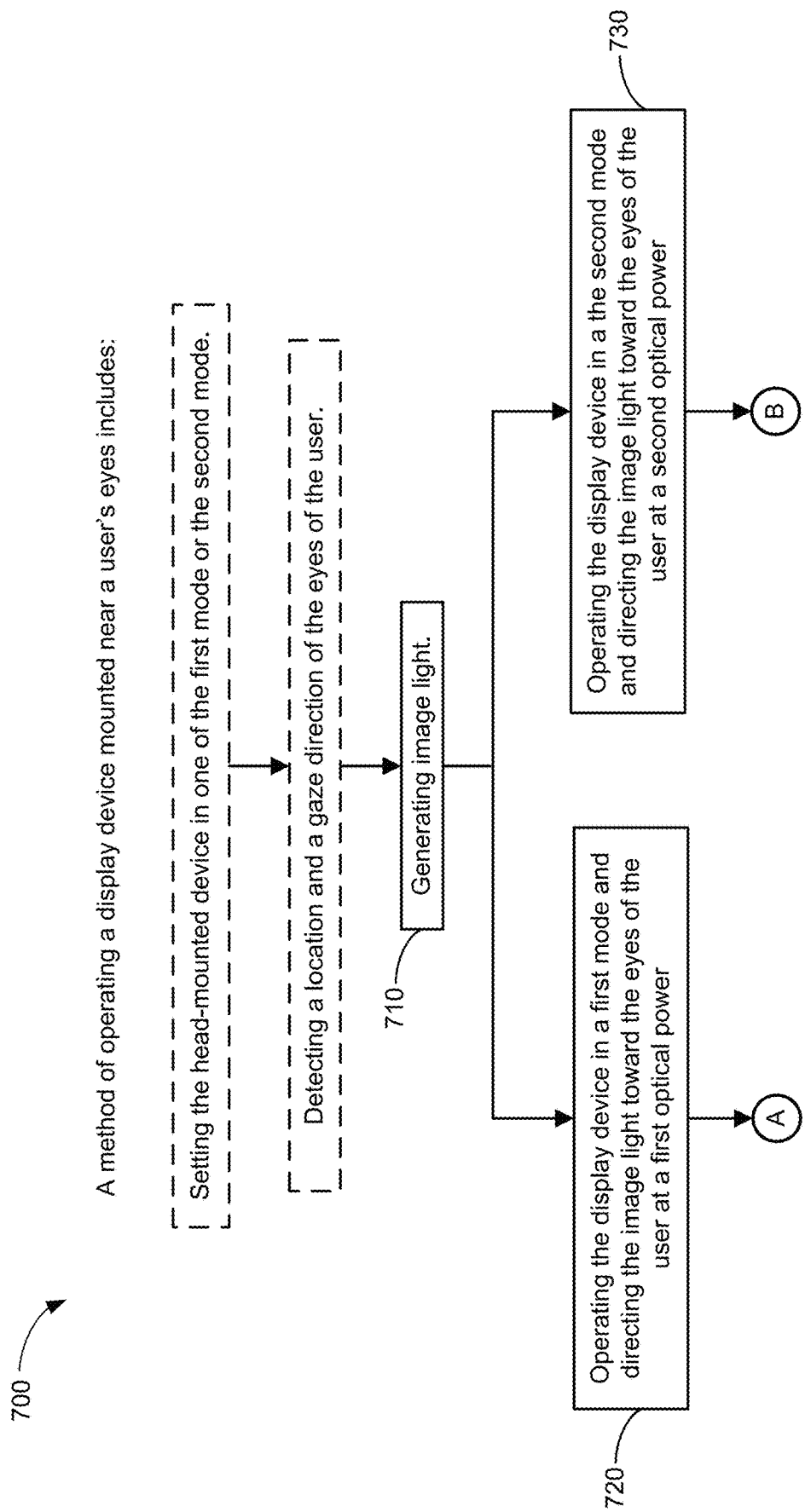
FIGS. 7A-7C illustrate a flowchart illustrating a method of operating a display device in accordance with some embodiments.
Figure 7B:
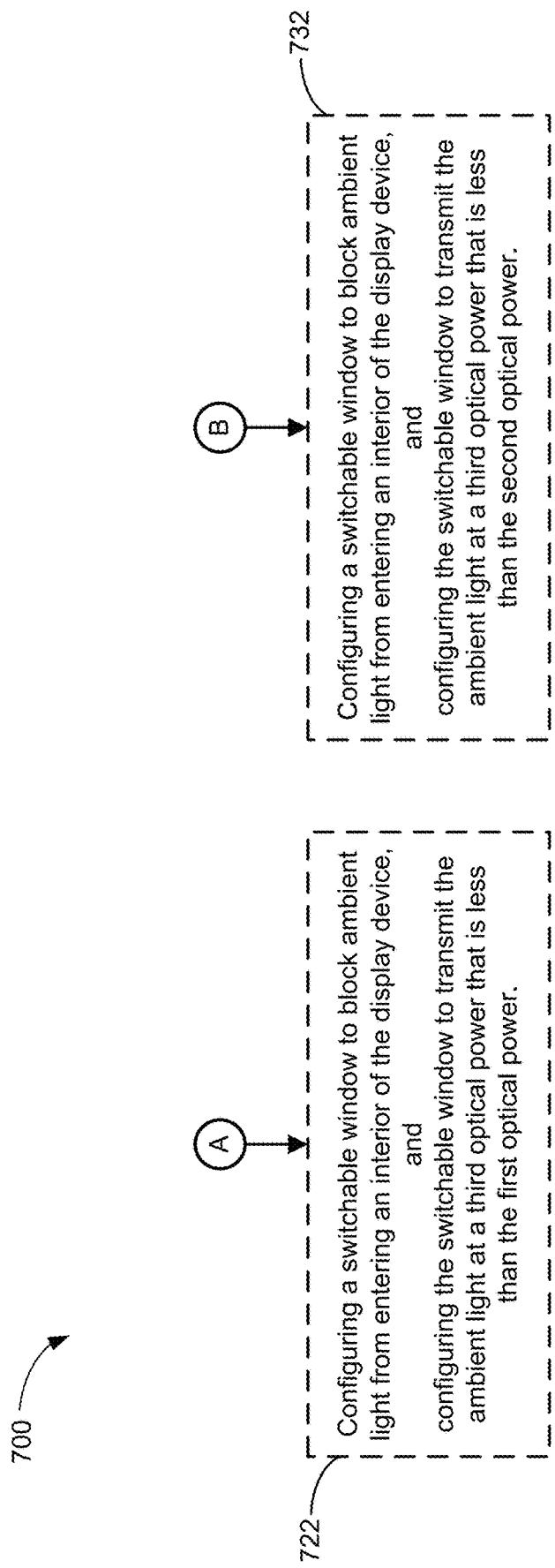
Figure 7C:
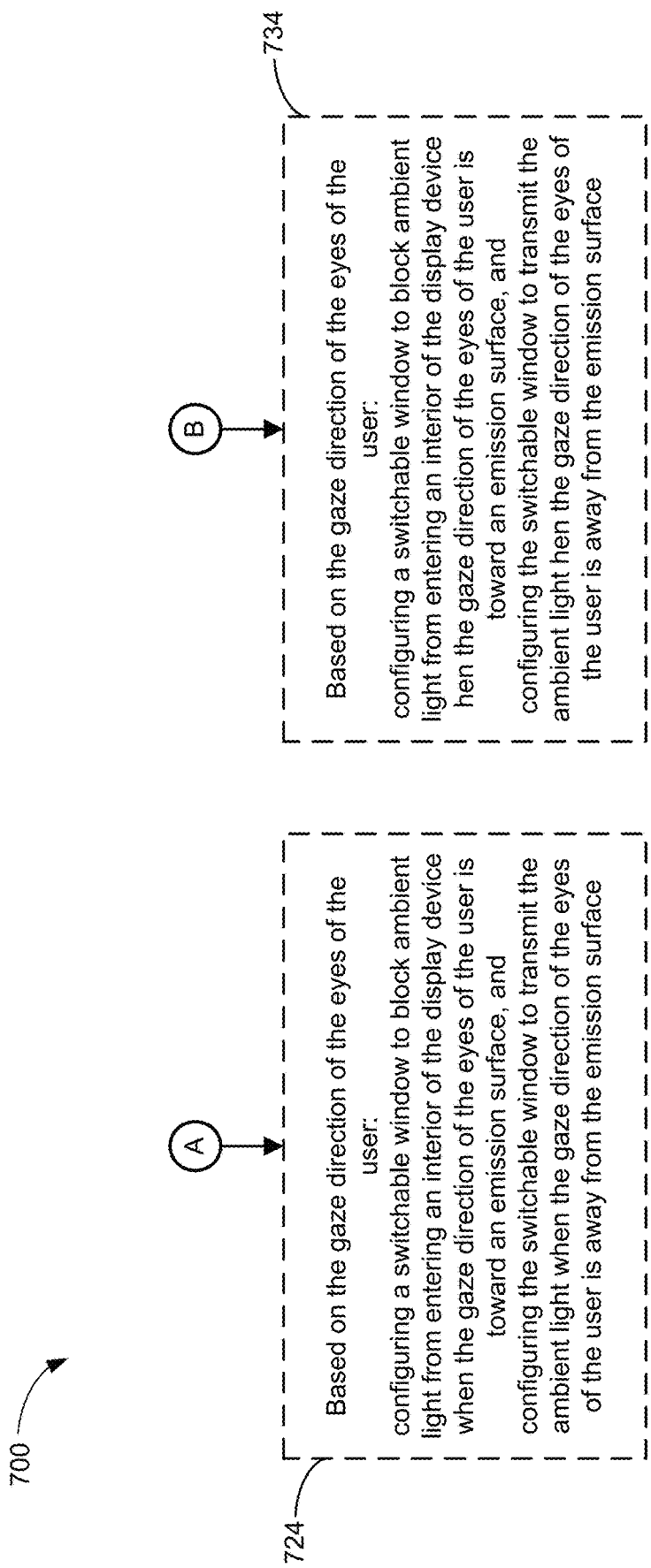

FIGS. 7A-7C illustrate method 700 of operating display device 400 mounted near a user's eyes in accordance with some embodiments. Method 700 includes (step 710) generating light. Method 700 also includes operating the display device in a first mode (e.g., wide field-of-view mode), including (step 720) directing the image light toward the eyes of the user at a first optical power and a first magnification. Method 700 also includes operating the display device in a second mode (e.g., high resolution mode), including (step 730) directing the image light toward the eyes of the user at a second optical power and a second magnification. In some embodiments, the first optical power is less than the second optical power. In some embodiments, the first magnification is less than the second magnification.

In some embodiments, method 700 further includes, either in the first mode or the second mode, (steps 722 and 732) configuring a switchable window to block ambient light from entering an interior of the display device and configuring the switchable window to transmit the ambient light and direct the ambient light at a third optical power and a third magnification. The third optical power is distinct from and less than the first optical power and the second optical power. The third magnification is distinct from and less than the first magnification and the second magnification.

In some embodiments, method 700 further includes detecting a location and a gaze direction of the eyes of the user. The method also includes (steps 724 and 734) based on the gaze direction of the eyes of the user, configuring a switchable window to either block the ambient light or transmit the ambient light. The switchable window is configured to block the ambient light from an interior of the display device when the gaze direction of the eyes of the user is toward an emission surface (e.g., setting switchable window 416 in the opaque mode when the gaze direction of the eyes is towards emission surface 410), and the switchable window is configured to transmit the ambient light when the gaze direction of the eyes of the user is away from the emission surface (e.g., setting switchable window 416 in the see-through mode when the gaze direction of the eyes is away from emission surface 410).

In accordance with some embodiments, a display device (e.g., display device 400) is operable in one of a first mode (e.g., wide field-of-view mode) or a second mode (e.g., high resolution mode). The display device includes an emission surface (e.g., emission surface 410) configured output image light (e.g., rays 420, 421), a first optical assembly (e.g., first optical assembly 412), and a second optical assembly (e.g., second optical assembly 414). The second optical assembly has a first region (e.g., first region 414-1) and a second region (e.g., second region 414-2). When the display device is operating in the first mode, the first optical assembly is configured to receive image light (e.g., ray 420) from the emission surface and to direct the image light at a first optical power and a first magnification. When the display device is operating in the second mode, the first optical assembly is configured to transmit the image light (e.g., rays 420, 421) without adding the first optical power, and the first region of the second optical assembly is configured to direct the image light at a second optical power and a second magnification. The second region of the second optical assembly is configured to receive ambient light (e.g., rays 422, 424, 428) from outside of the display device and to transmit the ambient light at a third optical power that is less than the first optical power and less than the second optical power. In some embodiments, the first optical assembly is located between the emission surface and the second optical assembly. In some embodiments, the emission surface includes a quarter wave plate configured to convert light from a linear polarization to a circular polarization and vice versa. In some embodiments, the first optical assembly has a first focal length and the first region of the second optical assembly has a second focal length different from and shorter than the first focal length. In some embodiments, the first optical assembly has a size that to corresponds (e.g., equals to, is the same as) the size of the first region.

In some embodiments, the first optical power is less than the second optical power (e.g., the optical power of the first region 414-1 of second optical assembly 414 is less than the optical power of the first optical assembly 412).

In some embodiments, the second region of the second optical assembly (e.g., second region 414-2 of second optical assembly 414) is configured to transmit ambient light (e.g., rays 422, 424, 428) to an eye (e.g., eye 340) of a user with reduced optical aberration compared to the first region of the second optical assembly (e.g., first region 414-1 of second optical assembly 414). In some embodiments, the second region of the second optical assembly is configured to transmit light to an eye of a user without significant optical aberration. In some embodiments, the second region of the second optical assembly is configured to transmit light to an eye of a user with no optical aberration.

In some embodiments, the third optical power is zero. In some embodiments, the first optical power and the second optical power are non-zero.

In some embodiments, the second region of the second optical assembly is configured to allow ambient light to pass through without change in direction (e.g., second region 414-2 of second optical assembly transmits one or more of rays 422, 424, and 428 without a change in direction).

In some embodiments, display device 400 also includes a switchable window (e.g., switchable window 416) configurable to be in one of an opaque mode or a see-through mode. The switchable window is configured to block the ambient light from entering an interior of the display device when the switchable window is in the opaque mode. The switchable window is configured to transmit the ambient light when the switchable window is in the see-through mode. The switchable window is configurable to be in either the opaque mode or the see-through mode when the display device is set in either the first mode (e.g., the wide field-of-view mode) or the second mode (e.g., the high resolution mode).

In some embodiments, when the display device (e.g., display device 400) is operating in the first mode (e.g., the wide field-of-view mode), a first optical path of light has one or more folds at the first optical assembly (e.g., first optical assembly 412) (e.g., the optical path of ray 420 includes one or more folds). When the display device is operating in the second mode (e.g., the high resolution mode), a second optical path of the image light has one or more folds at the first region of the second optical assembly (e.g., first region 414-1 of second optical assembly 414). A third optical path of the ambient light does not include a fold (e.g., the optical path of rays 422, 424, 428 do not include a fold).

In some embodiments, the emission surface has a first edge and a second edge opposite to the first edge (e.g., emission surface 410 has a first edge 410-A and a second edge 410-B). The switchable window has a first edge and a second edge opposite to the first edge (e.g., switchable window 416 has a first edge 416-A and a second edge 416-B). The first optical assembly has a first edge and a second edge opposite to the first edge (e.g., first optical assembly 412 has a first edge 412-A and a second edge 412-B that is opposite to first edge 412-A). The second optical assembly has a first edge and a second edge opposite to the first edge (e.g., second optical assembly 414 has a first edge 414-A and a second edge 414-B that is opposite to first edge 414-A). The first optical assembly is located between the emission surface and the second optical assembly (e.g., first optical assembly 412 is located between emission surface 410 and second optical assembly 414). The first region of the second optical assembly is adjacent to the first edge of the second optical assembly and the second region of the second optical assembly is adjacent to the second edge of the second optical assembly (first region 414-1 of the second optical assembly 414 is adjacent to the first edge 414-A and the second region 414-2 of the second optical assembly 414 is adjacent to the second edge 414-B). The first edge of the switchable window is disposed adjacent to one or more of the second edge of the emission surface and the second edge of the first optical assembly (e.g., first edge 416-A of switchable window 416 is disposed adjacent to one or more of the second edge 410-B of the emission surface 410 and the second edge 412-B of the first optical assembly 412). The second edge of the switchable window is disposed adjacent to the second edge of the second optical assembly (e.g., second edge 416-B of switchable window 416 is disposed adjacent to the second edge 414-B of the second optical assembly 414). The first edge of the first optical assembly, the first edge of the second optical assembly, and the first edge of the emission surface are disposed proximate to each other (e.g., first edge 412-A of the first optical assembly 412, the first edge 414-1 of the second optical assembly 414 and the first edge 410-A of the emission surface 410 are disposed proximate to each other). In some embodiments, the first edge of the first optical assembly is adjacent to the first edge of the emission surface. In some embodiments, the first edge of the first optical assembly, the first edge of the second optical assembly, and the first edge of the emission surface are adjacent to a frame (e.g., frame 418). In some embodiments, the second edge of the switchable window extends towards a cheek of the user. In some embodiments, the second edge of the second optical assembly extends towards a cheek of the user.

In some embodiments, the first region and the second region of the second optical assembly correspond to portions of a same piece of optical material (e.g., first region 414-1 and second region 414-2 of optical assembly 414 are regions of a same piece of a substrate, a semiconductor substrate, or glass).

In some embodiments, the first optical assembly includes a first set of optical components. The first set of optical components includes a beam splitter, a reflector, a first optical retarder, and a second optical retarder (e.g., first optical assembly 412 includes first beam splitter 512, first reflector 516, first optical retarder 514, and second optical retarder 513). The first optical retarder is positioned between the first beam splitter and the first reflector. In some embodiments, the second optical assembly includes a second set of optical components. The second set of optical components includes a second beam splitter, a second reflector, and a third optical retarder that is positioned between the second beam splitter and the second reflector (e.g., second optical assembly 414 includes second beam splitter 515, third optical retarder 517, and second reflector 519).

In some embodiments, the first optical assembly also includes a first switchable optical retarder and a second switchable optical retarder. The optical retarders are configurable to be in one of an active state or an inactive state (e.g., first optical assembly 412 includes first switchable optical retarder 510 second switchable optical retarder 511; first switchable optical retarder 510 and second switchable optical retarder 511 are configured to operate in either an "on" state or an "off" state). In the inactive state, the switchable optical retarder is configured to convert light incident on the switchable optical retarder from an initial polarization to an orthogonal polarization (e.g., in the "off" state, the switchable optical retarder is configured to transmit and convert the light to an orthogonal polarization). In the active state, the switchable optical retarder is configured to transmit light incident on the switchable optical retarder without changing the polarization of the light (e.g., in the "on" state, the switchable optical retarder is configured to transmit light without changing the polarization of the light). In some embodiments, the first beam splitter is positioned between the first switchable optical retarder and the first optical retarder (e.g., first beam splitter 512 is located between first switchable optical retarder 510 and first optical retarder 514). In some embodiments, the first switchable optical retarder is positioned between the emission surface and the first beam splitter (e.g., first switchable optical retarder 510 is located between emission surface 410 and first beam splitter 512). In some embodiments, the second switchable optical retarder and the second wave retarder are positioned between the first reflector and the second beam splitter (e.g., second switchable optical retarder 511 and second wave retarder 513 are located between first reflector 516 and second beam splitter 515).

In some embodiments, the optical components of the second set of optical components (e.g., the optical components of the second optical assembly) have a first section corresponding to the first region of the second optical assembly and a second section corresponding to the second region the second optical assembly (e.g., first region 414-1 of second optical assembly 414 includes a first section 515-1 of second beam splitter 515, a first section 517-1 of second optical retarder 517, and a first section 519-1 of second reflector 519; and second region 414-2 of second optical assembly 414 includes a second section 515-2 of second beam splitter 515, a second section 517-2 of second optical retarder 517, and a second section 519-2 of second reflector 519). The first section of the second beam splitter is configured to output first image light by transmitting at least a portion of the image light (e.g., first section 515-1 of second beam splitter 515 is configured to receive ray 420'-C and transmit at least a portion of ray 420'-C as ray 420'-D). The first section of the second optical retarder is configured to convert the first image light from a first polarization to a second polarization (e.g., first section 517-1 of third optical retarder 517 is configured to convert ray 420'-D having the first circular polarization to the second linear polarization). The first section of the second reflector is configured to output a second image light by reflecting the first image light having the second polarization towards the second optical retarder and beam splitter (e.g., first section 519-1 of second reflector 519 is configured to receive ray 420'-D having the second linear polarization and reflect at least a portion of ray 420'-D as ray 420'-E). The first section of the second optical retarder is further configured to convert the second image light from the second polarization to the first polarization (e.g., first section 517-1 of third optical retarder 517 is configured to convert ray 420'-D having the second linear polarization to the first circular polarization). The first section of the second beam splitter is configured to receive the second image light in the first polarization, and to output a third image light by reflecting at least a portion of the second image light, the third image light having a third polarization that is orthogonal to the first polarization (e.g., first section 515-1 of second beam splitter 515 is configured to receive ray 420'-E having the first circular polarization and to reflect at least a portion of ray 420'-E as ray 420'-F having the second circular polarization). The first section of the second optical retarder is further configured to convert the third image light from the third polarization to a fourth polarization that is orthogonal to the second polarization (e.g., first section 517-1 of third optical retarder 517 is configured to convert ray 420'-F having the second circular polarization to the first linear polarization). The first section of the second reflector is configured to transmit at least a portion of the third image light in the fourth polarization (e.g., first section 519-1 of second reflector 519 is configured to receive ray 420'-F having the first linear polarization and transmit at least a portion of ray 420'-F as ray 420'-G).

In some embodiments, the third optical retarder (e.g., optical retarder 517) in the second optical assembly is a quarter wave plate configured to convert light between linear and circular polarizations. In some embodiments, the second reflector (e.g., second reflector 519) in the second optical assembly is a polarizing reflector that reflects light having a first polarization and transmits light having a fourth polarization (e.g., second reflector 519 reflects light having the first linear polarization and transmits light having the second linear polarization).

In some embodiments, the second section of the second beam splitter is configured to transmit at least a first portion of the received ambient light (e.g., second section 515-2 of second beam splitter 515 is configured to receive ray 422-A and/or ray 424-A and transmit at least a portion of ray 422-A as ray 422-B and/or transmit a at least a portion of ray 424-A as ray 424-B). The second section of the third optical retarder is configured to convert the first portion of the received ambient light from a third polarization to a fourth polarization (e.g., second section 517-2 of third optical retarder 517 is configured to convert ray 422-C having the second circular polarization into ray 422-D having the second linear polarization; second section 517-2 of third optical retarder 517 is configured to transmit ray 424-C as ray 424-D). The second section of the second reflector is configured to transmit a second portion of the received ambient light having the fourth polarization (second section 519-2 of second reflector 519 is configured to transmit ray 422-D as ray 422-E and/or transmit ray 424-D as ray 424-E having the second linear circular polarization).

In some embodiments, display device includes an eye-tracking module (e.g., eye-tracking module 217). The eye-tracking module is configured to detect a gaze direction of the eye of the user and to set the switchable window (e.g., switchable window 416) in one of the opaque mode or the see-through mode when the display device is in the second mode (e.g., the high-resolution mode), based on the gaze direction of the eye of the user.

In some embodiments, display device 400 is a head-mounted display device.

In accordance with some embodiments, a method of operating a display device (e.g., display device 400) mounted near the eyes includes generating image light. Operating the display device in a first mode (e.g., wide field-of-view mode) includes directing the image light toward the eyes of the user at a first optical power and a first magnification. Operating the display device in a second mode (e.g., high resolution mode) includes directing the image light toward the eyes of the user at a second optical power and a second magnification. In some embodiments, the first optical power is less than the second optical power. In some embodiments, the first magnification is less than the second magnification.

In some embodiments, the method further includes, in the first mode (e.g., wide field-of-view mode) or the second mode (e.g., high resolution mode), configuring a switchable window (e.g., switchable window 416) to block ambient light from entering an interior of the display device and configuring the switchable window to transmit the ambient light and direct the ambient light at a third optical power and a third magnification. The third optical power is less than the first optical power and the second optical power. The third magnification is distinct from and less than the first magnification and the second magnification.

In some embodiments, the method further includes detecting a location and a gaze direction of the eyes of the user and, based on the gaze direction of the eyes of the user, and configuring a switchable window (e.g., switchable window 416) to either block ambient the light or transmit the ambient light. The switchable window is configured to block the ambient light from an interior of the display device when the gaze direction of the eyes of the user is toward an emission surface (e.g., emission surface 410) (e.g., setting switchable window 416 in the opaque mode when the gaze direction of the eyes is towards emission surface 410). The switchable window is configured to transmit the ambient light when the gaze direction of the eyes of the user is away from the emission surface (e.g., setting switchable window 416 in the see-through mode when the gaze direction of the eyes is away from emission surface 410).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
   an emission surface configured to output image light;
   a first optical assembly; and
   a second optical assembly having a first region and a second region, wherein:
      the display device is operable in either one of a first mode and a second mode;
      the first optical assembly is configured to direct the image light at a first optical power while the display device is operating in the first mode;
      the first optical assembly is configured to transmit the image light with a second optical power, different from the first optical power, while the display device is operating in the second mode;
      the first optical assembly is located between the emission surface and the second optical assembly so that the first region of the second optical assembly directs the image light received from the first optical assembly at a third optical power; and
      the second region of the second optical assembly is configured to receive ambient light from outside of the display device and to transmit the ambient light at a fourth optical power less than the first optical power and less than the third optical power so that:
         the image light is directed based on a combination of the first optical power and the third optical power while the device is operating in the first mode;
         the image light is directed based on a combination of the second optical power and the third optical power while the device is operating in the second mode; and
         the ambient light is directed based on the fourth optical power.

2. The display device of claim 1, wherein the first optical power is less than the third optical power.

3. The display device of claim 1, wherein the second region of the second optical assembly is configured to transmit the ambient light to an eye of a user with reduced optical aberration compared to the first region of the second optical assembly.

4. The display device of claim 1, wherein the fourth optical power is zero.

5. The display device of claim 1, wherein the second region of the second optical assembly is configured to allow the ambient light to pass through without change in direction.

6. The display device of claim 1, further comprising:
a switchable window configurable to be in one of an opaque mode or a see-through mode, wherein
the switchable window is configured to block the ambient light from entering an interior of the display device when the switchable window is in the opaque mode;
the switchable window is configured to transmit the ambient light when the switchable window is in the see-through mode; and
the switchable window is configurable to be in either the opaque mode or the see-through mode when the display device is in either the first mode or the second mode.

7. The display device of claim 6, wherein:
when the display device is operating in the first mode, a first optical path of the image light has one or more folds at the first optical assembly,
when the display device is operating in the second mode, a second optical path of the image light has one or more folds at the first region of the second optical assembly, and
a third optical path of the ambient light does not include a fold.

8. The display device of claim 7, wherein:
the emission surface has a first edge and a second edge opposite to the first edge;
the switchable window has a first edge and a second edge opposite to the first edge;
the first optical assembly has a first edge and a second edge opposite to the first edge; and
the second optical assembly has a first edge and a second edge opposite to the first edge, wherein
the first region of the second optical assembly is adjacent to the first edge of the second optical assembly;
the second region of the second optical assembly is adjacent to the second edge of the second optical assembly;
the first edge of the switchable window is disposed adjacent to one or more of the second edge of the emission surface and the second edge of the first optical assembly;
the second edge of the switchable window is disposed adjacent to the second edge of the second optical assembly; and
the first edge of the first optical assembly, the first edge of the second optical assembly, and the first edge of the emission surface are disposed proximate to each other.

9. The display device of claim 7, further comprising:
an eye-tracking module configured to detect a gaze direction of the eye of a user and to set the switchable window in one of the opaque mode or the see-through mode, based on the gaze direction of the eye of the user.

10. The display device of claim 1, wherein the first region and the second region correspond to portions of a same piece of optical material.

11. The display device of claim 1, wherein:
the first optical assembly includes a first set of optical components, the first set of optical components including:
a first beam splitter;
a first reflector;
a first optical retarder positioned between the first beam splitter and the first reflector; and
a second optical retarder; and
the second optical assembly includes a second set of optical components, the second set of optical components including:
a second beam splitter;
a second reflector; and
a third optical retarder positioned between the second beam splitter and the second reflector.

12. The display device of claim 11, wherein:
the optical components of the second set of optical components each have a first area corresponding to the first region and a second area corresponding to the second region, wherein
a first area of the second beam splitter is configured to output first image light by transmitting at least a region of the image light,
a first area of the third optical retarder is configured to convert the first image light from a first polarization to a second polarization,
a first area of the second reflector is configured to output a second image light by reflecting the first image light having the second polarization towards the third optical retarder and the second beam splitter,
the first area of the third optical retarder is further configured to convert the second image light from the second polarization to the first polarization,
the first area of the second beam splitter is configured to receive the second image light in the first polarization, and to output a third image light by reflecting at least a region of the second image light, the third image light having a third polarization that is orthogonal to the first polarization,
the first area of the third optical retarder is further configured to convert the third image light from the third polarization to a fourth polarization that is orthogonal to the second polarization, and
the first area of the second reflector is configured to transmit at least a region of the third image light in the fourth polarization.

13. The display device of claim 12, wherein:
the second area of the first beam splitter is configured to transmit at least a first region of the received ambient light;
the second area of the third optical retarder is configured to convert the first region of the received ambient light from a third polarization to a fourth polarization; and
the second area of the second reflector is configured to transmit a second region of the received ambient light having the fourth polarization.

14. The display device of claim 1, wherein the display device is a head-mounted display device.

15. A method of operating a display device mounted near a user's eyes, comprising:
generating image light;
operating the display device of claim 1 in the first mode, including directing the image light toward the eyes of the user at the first optical power; and
operating the display device in a second mode, including directing the image light toward the eyes of the user at the third optical power, wherein the first optical power is less than the third optical power.

16. The method of claim 15, further comprising:
in the first mode or the second mode:

configuring a switchable window to block ambient light from entering an interior of the display device, and configuring the switchable window to transmit the ambient light and direct the ambient light at the fourth optical power less than the first optical power.

17. The method of claim 15, further comprising:

detecting a location and a gaze direction of the eyes of the user; and based on the gaze direction of the eyes of the user, configuring a switchable window to either block ambient light or transmit the ambient light, wherein:

the switchable window is configured to block the ambient light from an interior of the display device when the gaze direction of the eyes of the user is toward an emission surface; and the switchable window is configured to transmit the ambient light when the gaze direction of the eyes of the user is away from the emission surface.

18. The display device of claim 1, wherein the first optical assembly has a first size in a direction perpendicular to an optical axis of the first optical assembly and the second optical assembly has a second size greater than the first size in a direction perpendicular to an optical axis of the second optical assembly.

19. A display device comprising:

an emission surface configured to output image light;

a first optical assembly;

a second optical assembly having a first region and a second region; and a switchable optical retarder positioned between the first optical assembly and the second optical assembly and configurable to be in one of an active state or an inactive state, wherein:

the display device is operable in either one of a first mode and a second mode;

in the inactive state, the switchable optical retarder is configured to convert light incident on the switchable optical retarder from an initial polarization to an orthogonal polarization;

in the active state, the switchable optical retarder is configured to transmit light incident on the switchable optical retarder;

the switchable optical retarder is configured to be in the active state so that the second optical assembly receives image light having a first polarization while the display device is in the first mode; and the switchable optical retarder is configured to be in the inactive state so that the second optical assembly receives image light having a second polarization, orthogonal to the first polarization, while the display device is in the second mode.

* * * * *